July 24, 1956
L. J. BISHOP
2,755,505
MOLDING PLANT
Original Filed Aug. 6, 1951
19 Sheets-Sheet 1
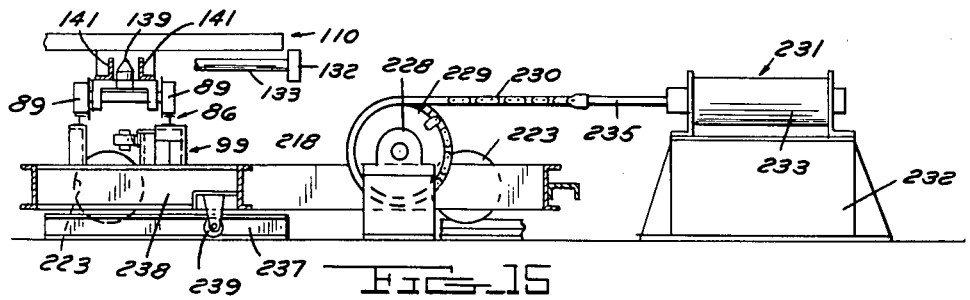
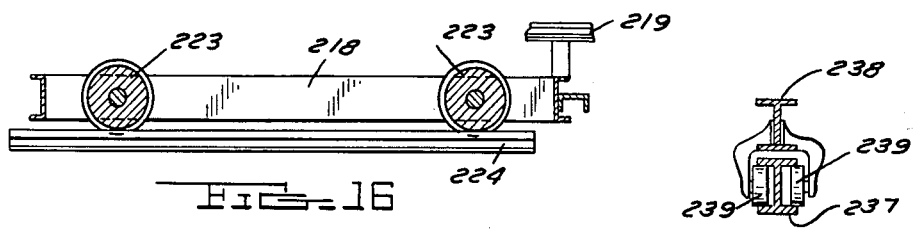 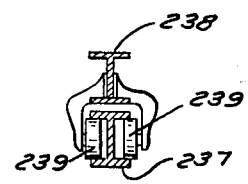
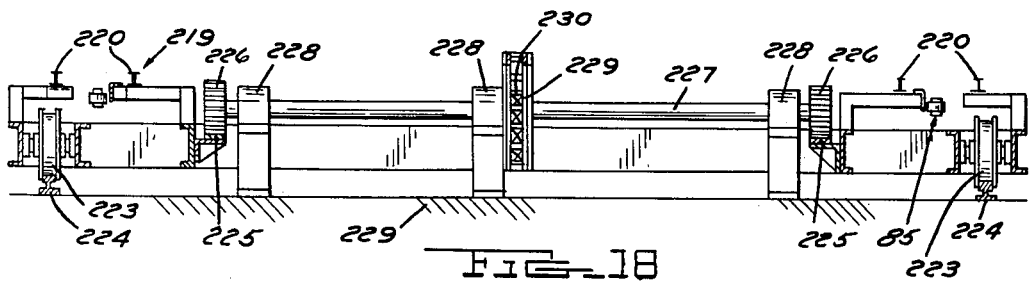
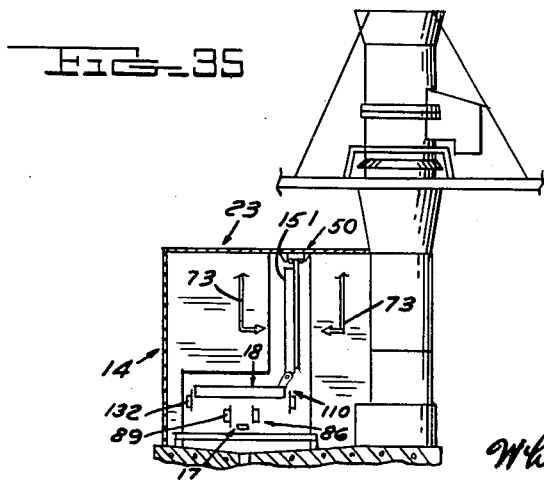
INVENTOR.
LEONARD J. BISHOP
BY
Whittemore, Hulbert & Belknap
ATTORNEYS July 24, 1956
L. J. BISHOP
2,755,505
MOLDING PLANT
Original Filed Aug. 6, 1951
19 Sheets-Sheet 2
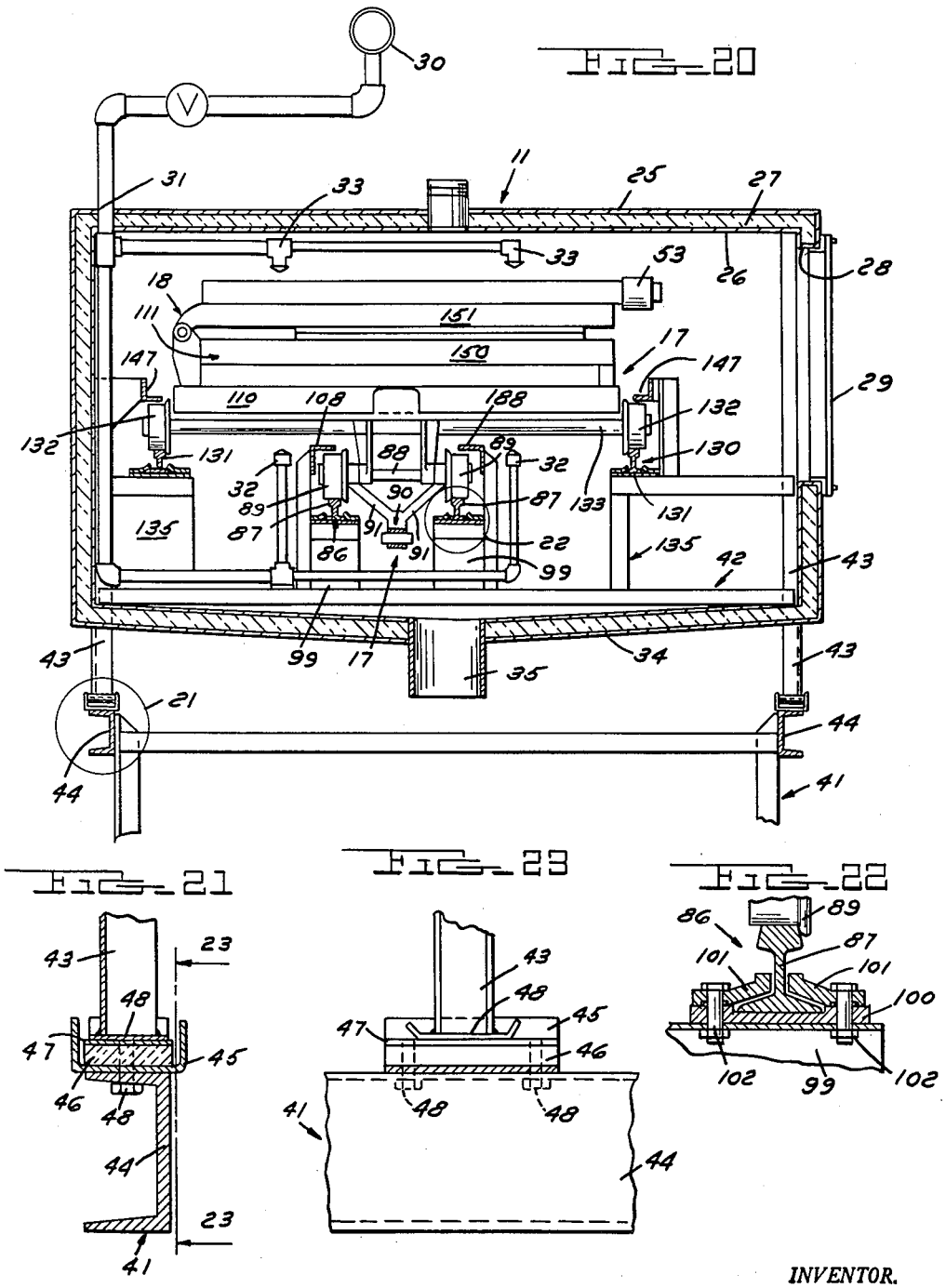
INVENTOR.
LEONARD J. BISHOP
BY
Whitmore, Hulbert & Belknap
ATTORNEYS July 24, 1956 L. J. BISHOP 2,755,505
MOLDING PLANT Original Filed Aug. 6, 1951 19 Sheets-Sheet 3

INVENTOR.
LEONARD J. BISHOP
BY
Whittemore, Hulbert & Belknap
ATTORNEYS

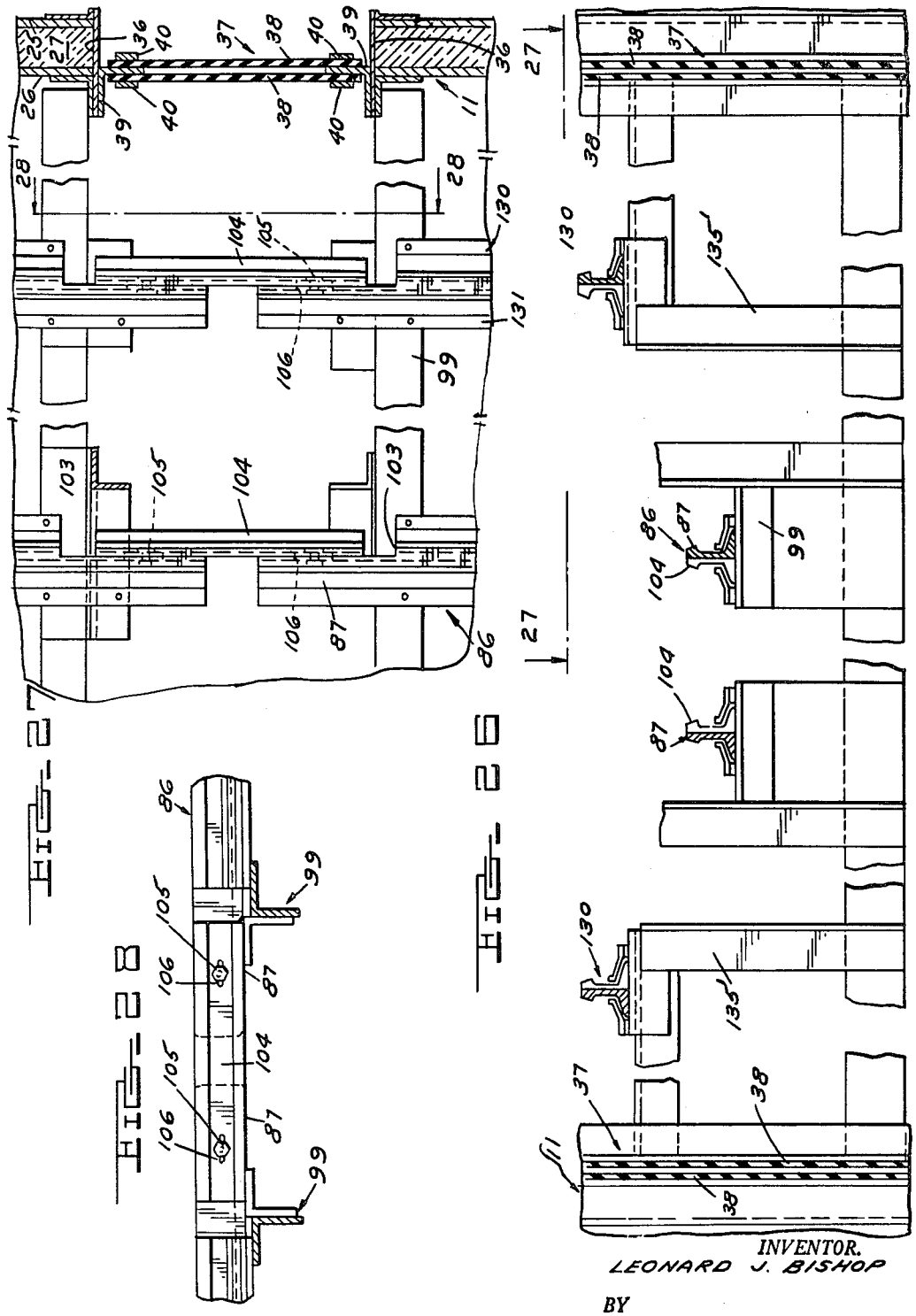

July 24, 1956
L. J. BISHOP
2,755,505
MOLDING PLANT
Original Filed Aug. 6, 1951
19 Sheets—Sheet 5
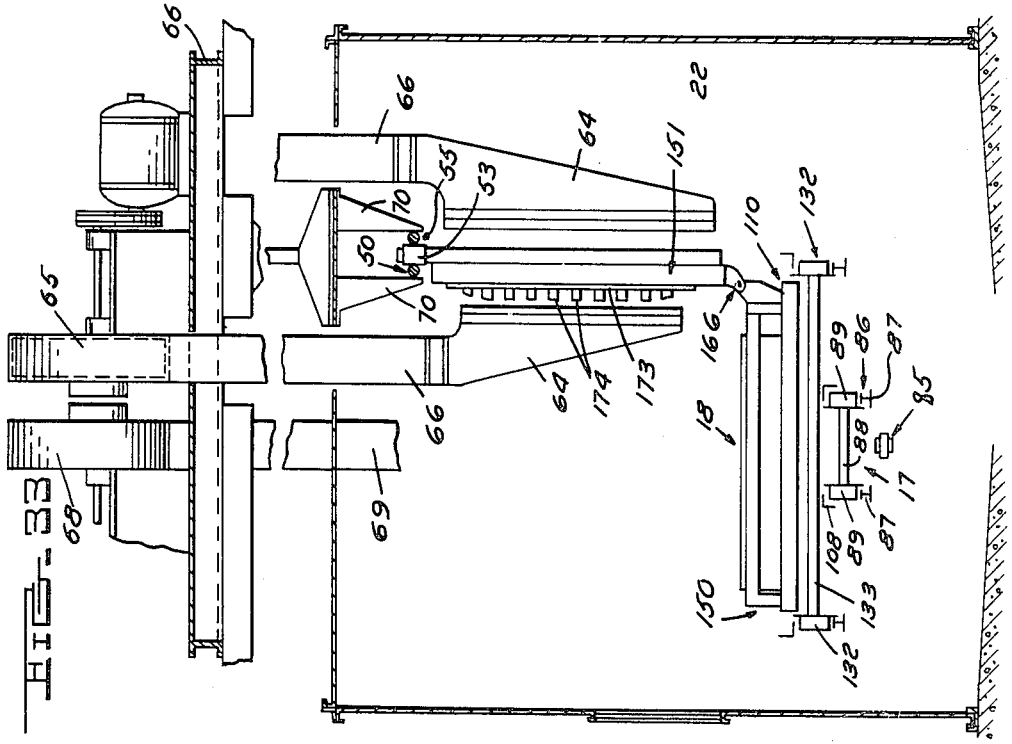
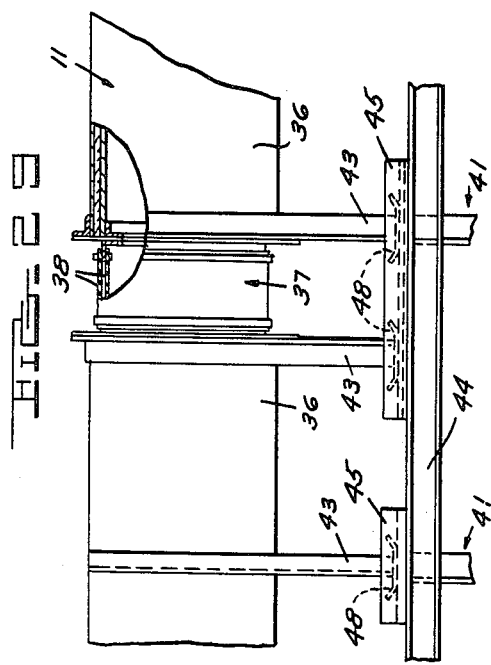
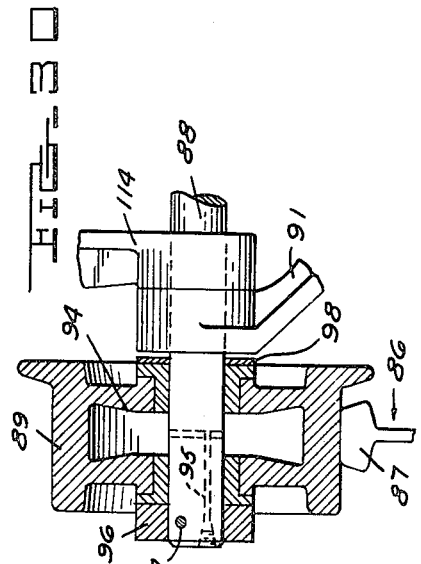
INVENTOR.
LEONARD J. BISHOP
BY
Whitmore, Hulbert & Belknap
ATTORNEYS

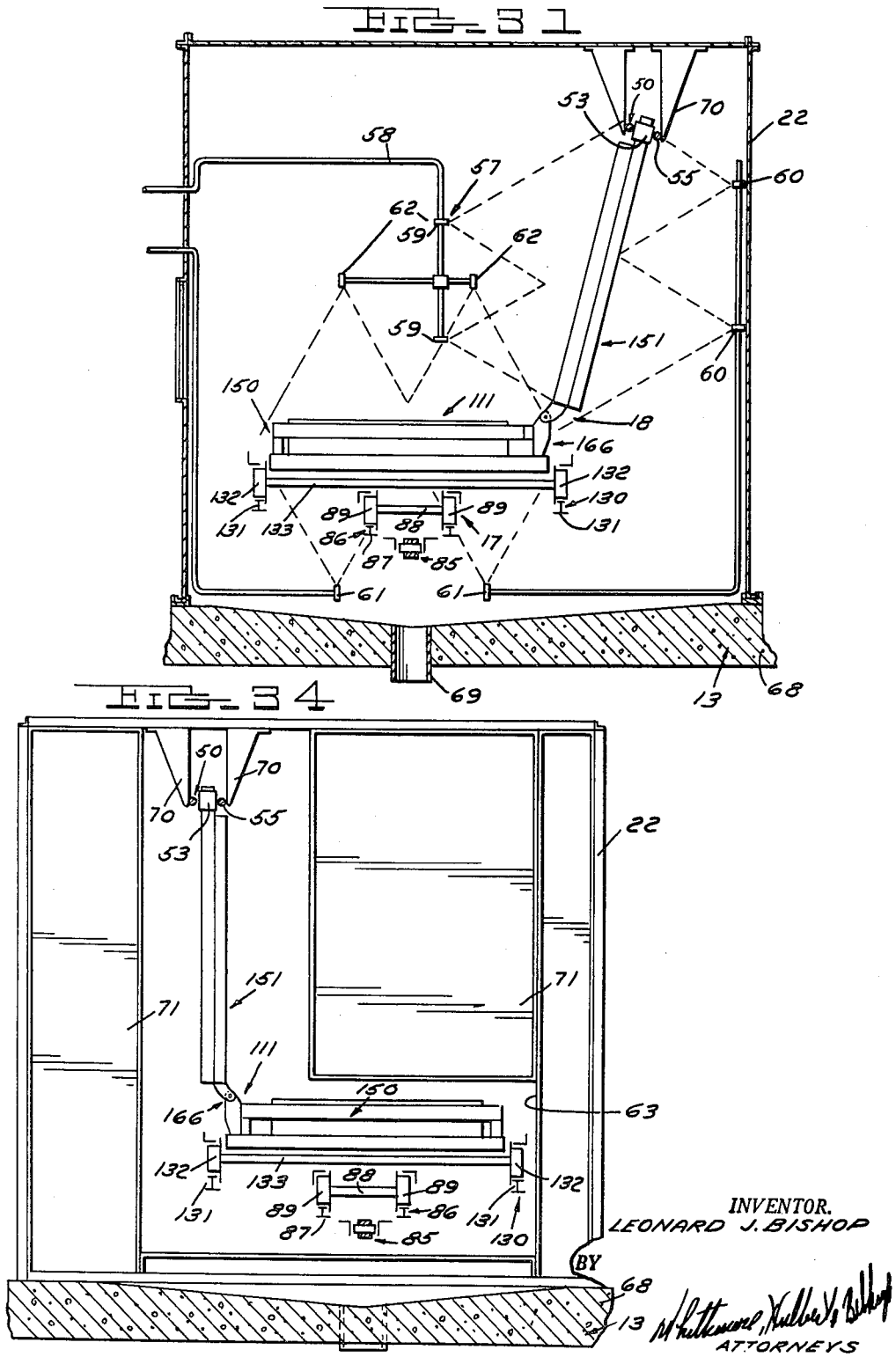

July 24, 1956
L. J. BISHOP
2,755,505
MOLDING PLANT
Original Filed Aug. 6, 1951
19 Sheets-Sheet 7
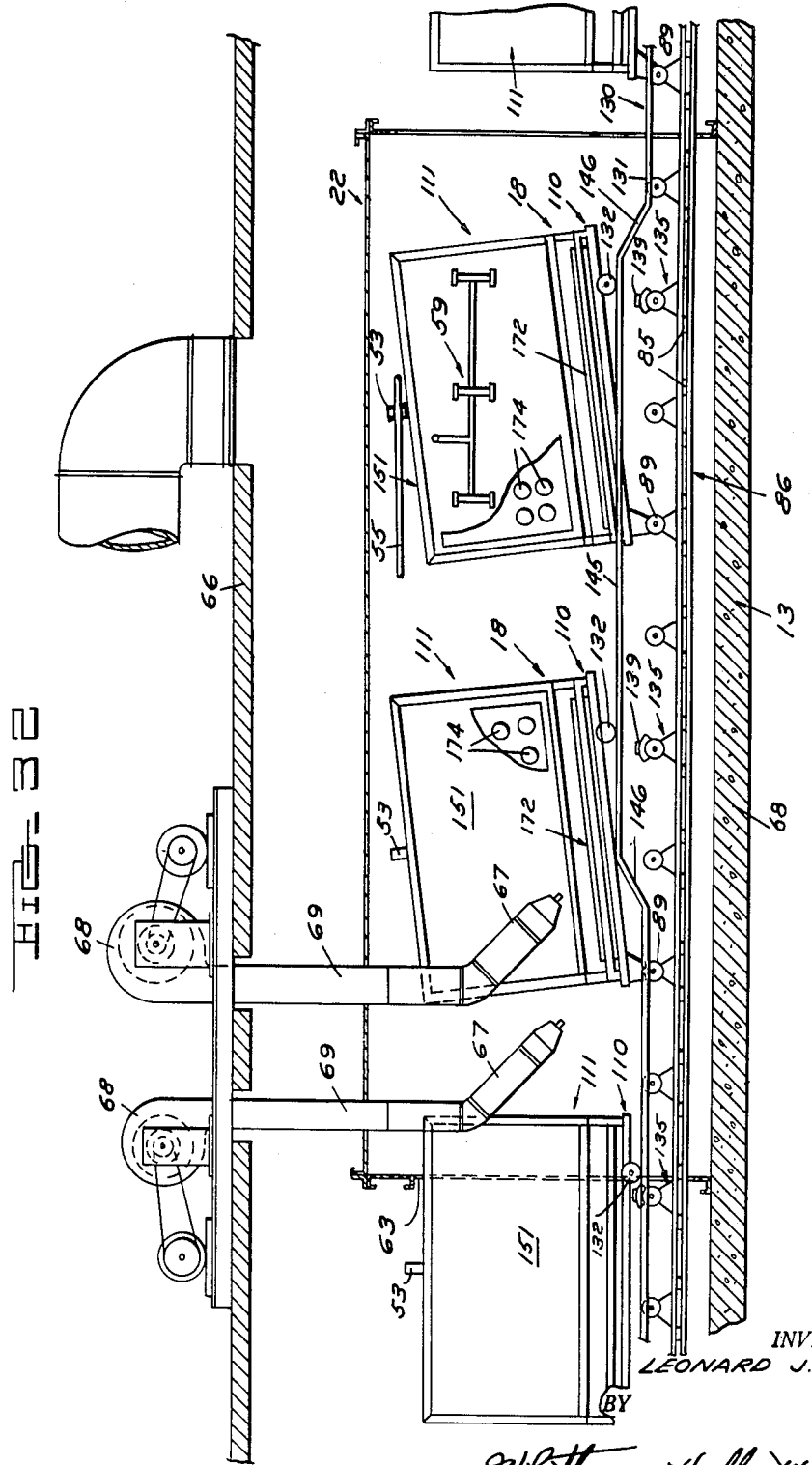
INVENTOR.
LEONARD J. BISHOP
BY
Whittemore, Hulbert & Belknap
ATTORNEYS July 24, 1956 L. J. BISHOP 2,755,505
MOLDING PLANT
Original Filed Aug. 6, 1951 19 Sheets-Sheet 8
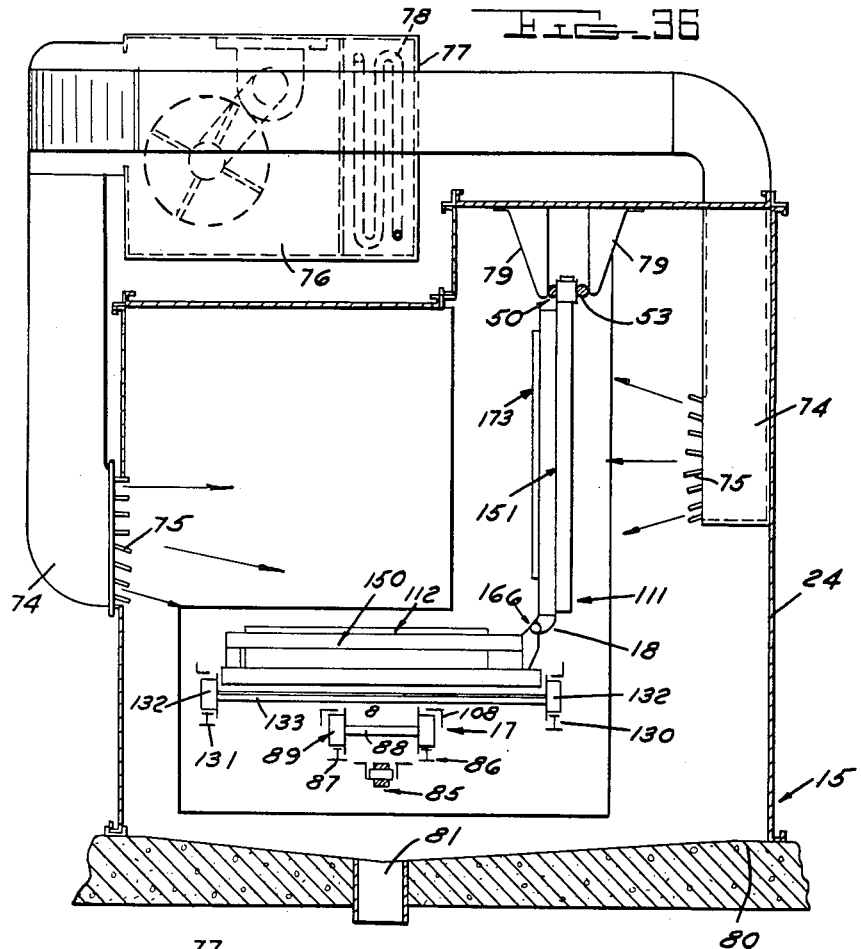
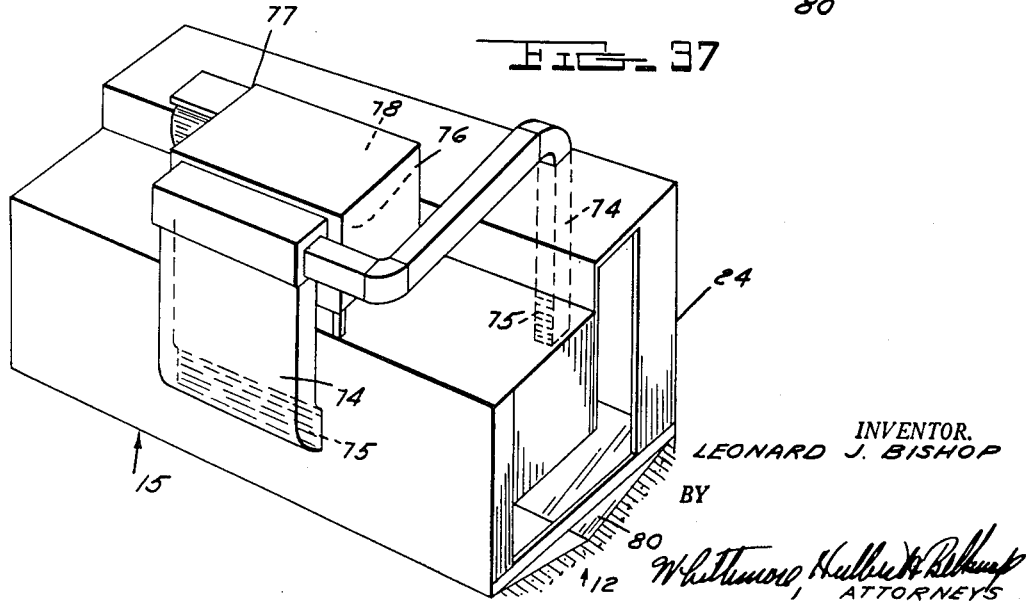
INVENTOR.
LEONARD J. BISHOP
BY
ATTORNEYS

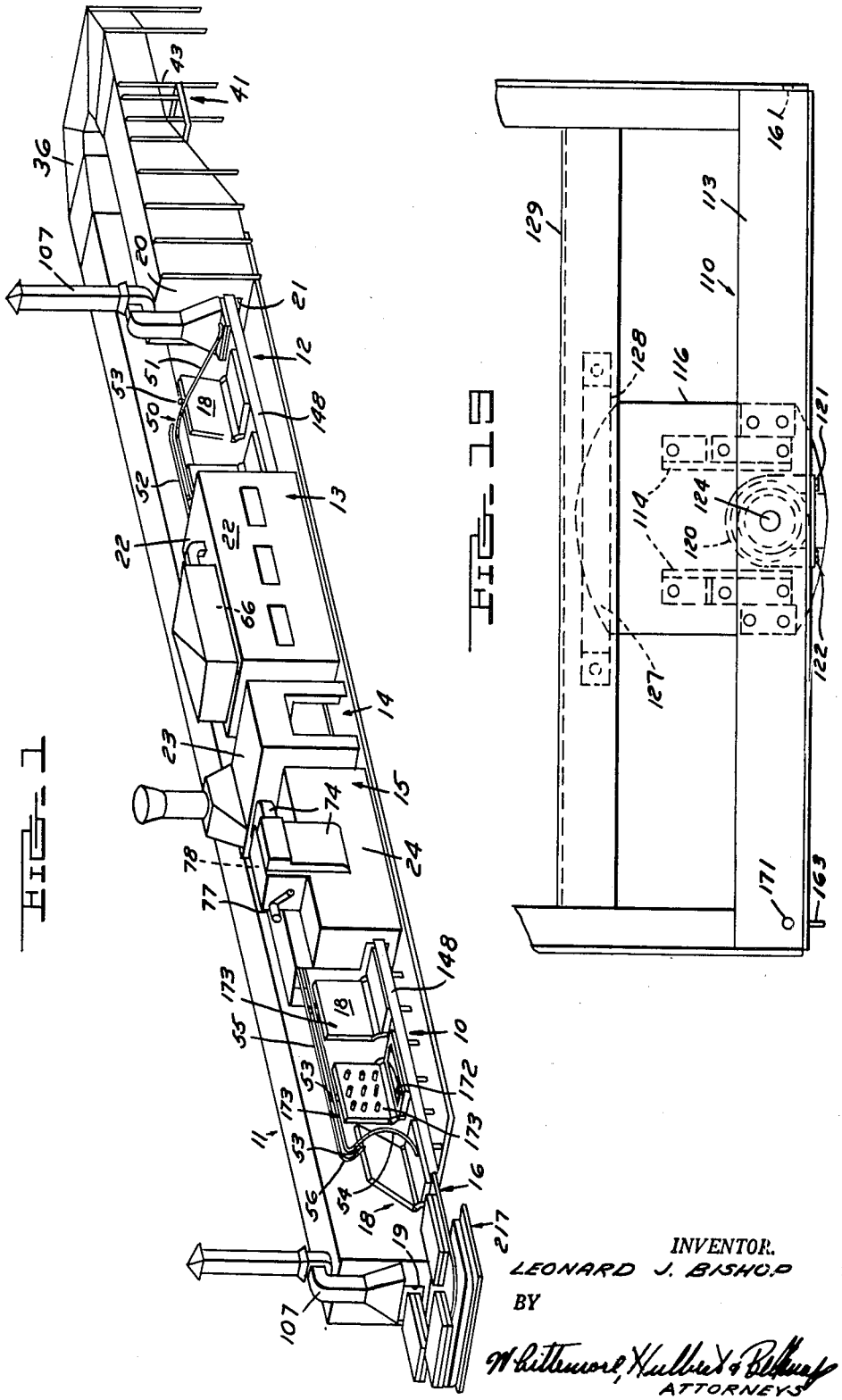

July 24, 1956
L. J. BISHOP
2,755,505
MOLDING PLANT
Original Filed Aug. 6, 1951
19 Sheets-Sheet 10
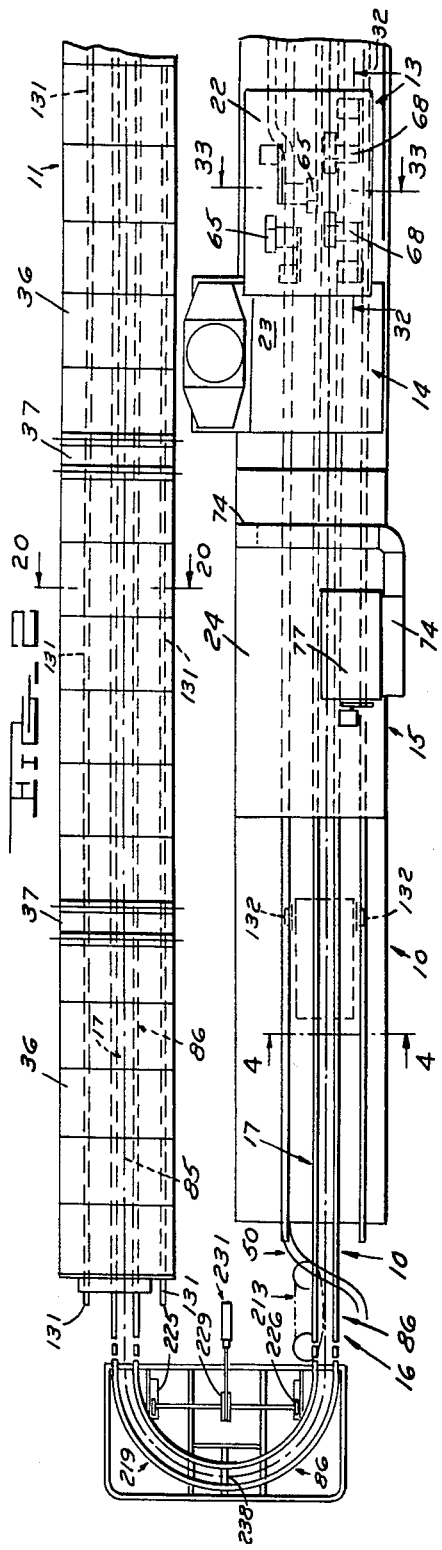
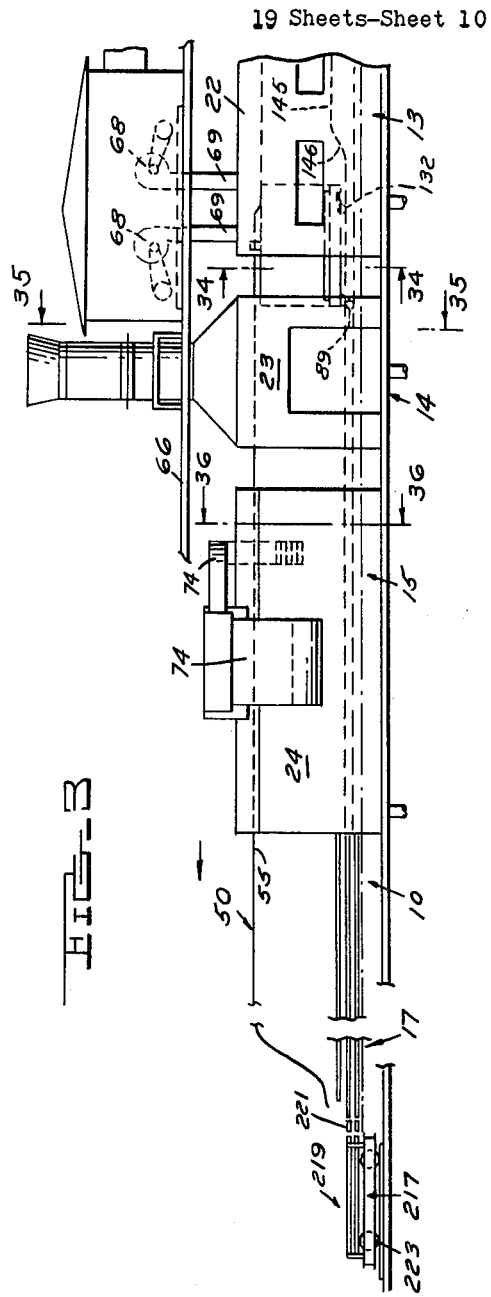
INVENTOR.
LEONARD J. BISHOP
BY
Whittemore, Hulbert & Belknap
ATTORNEYS

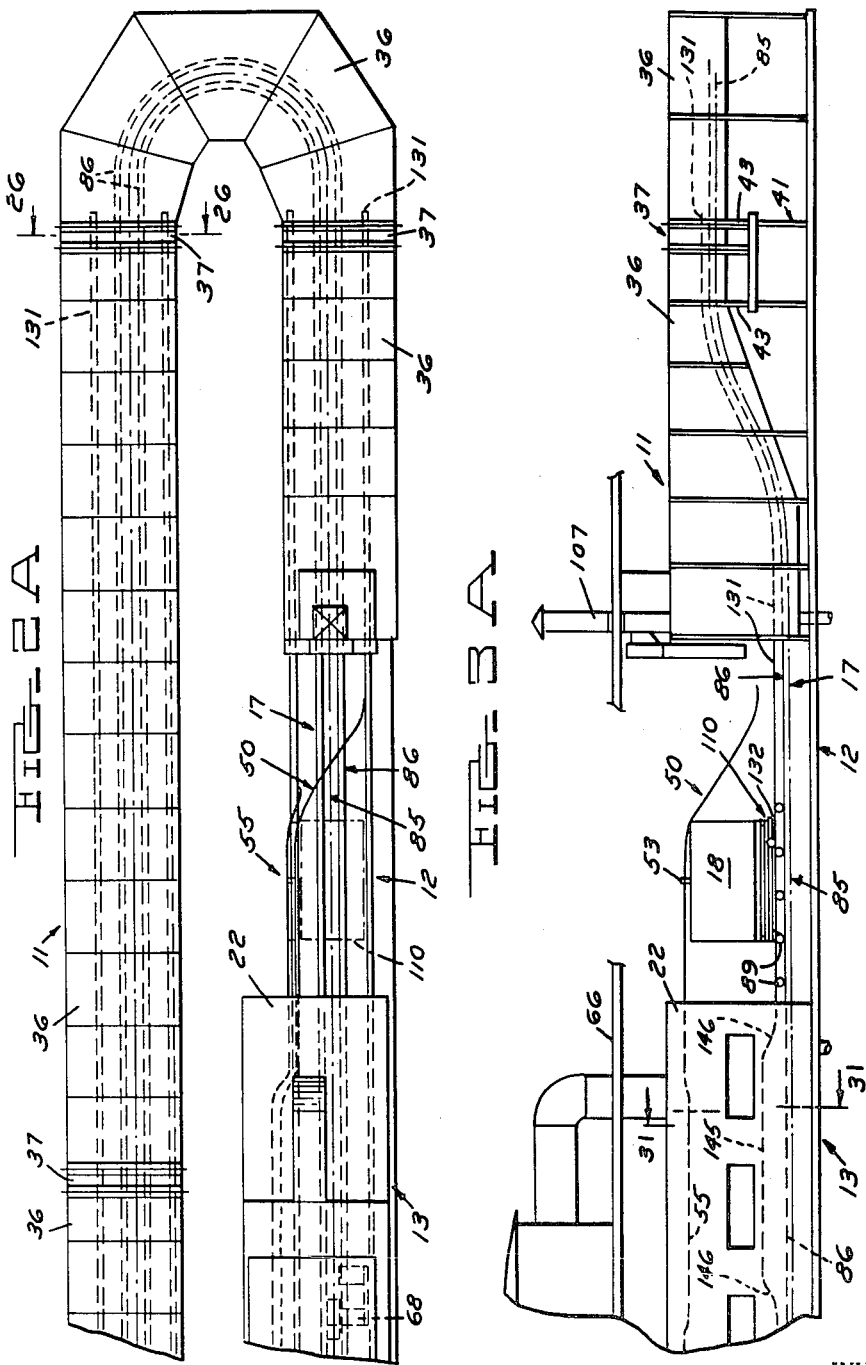

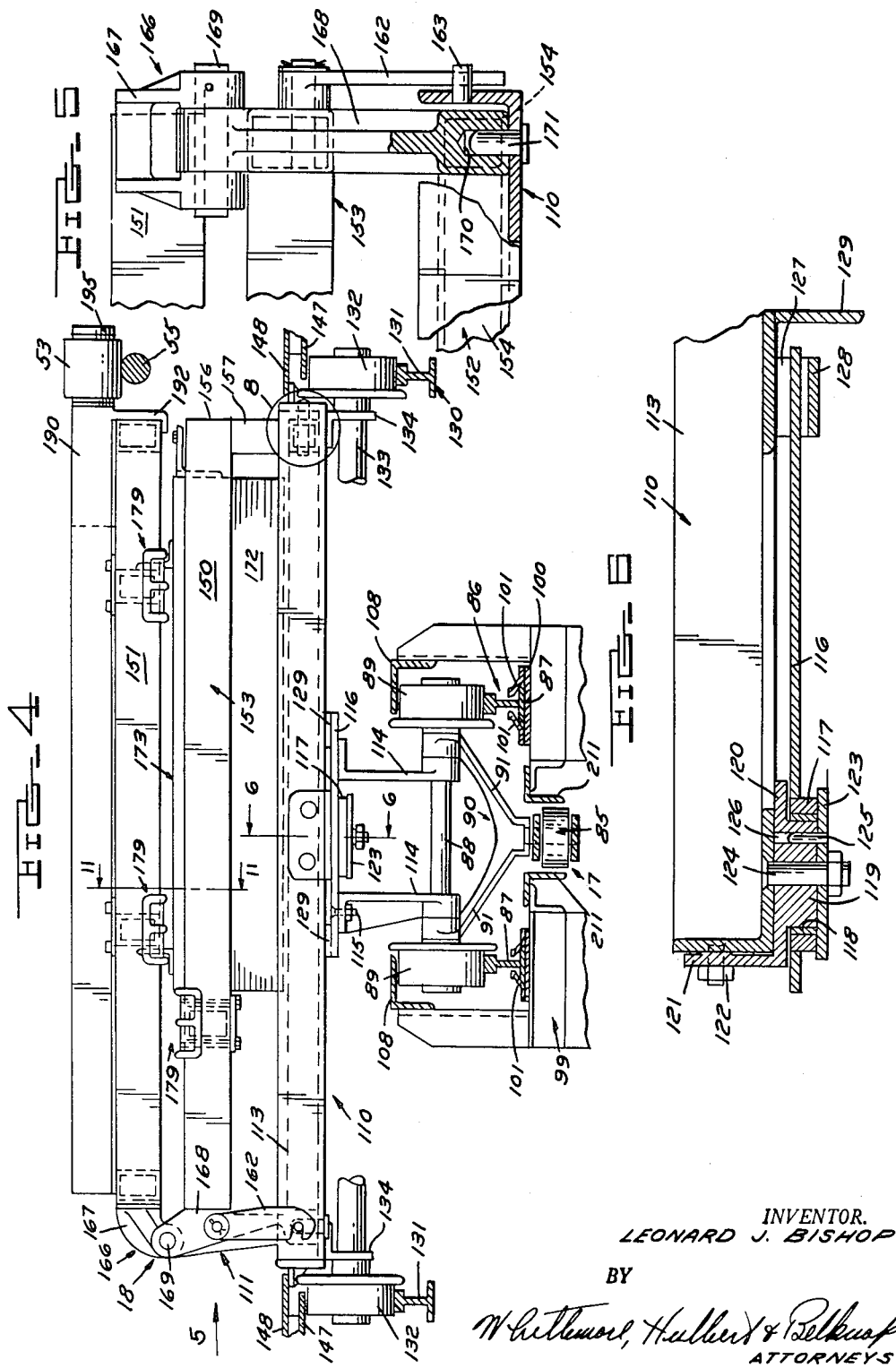

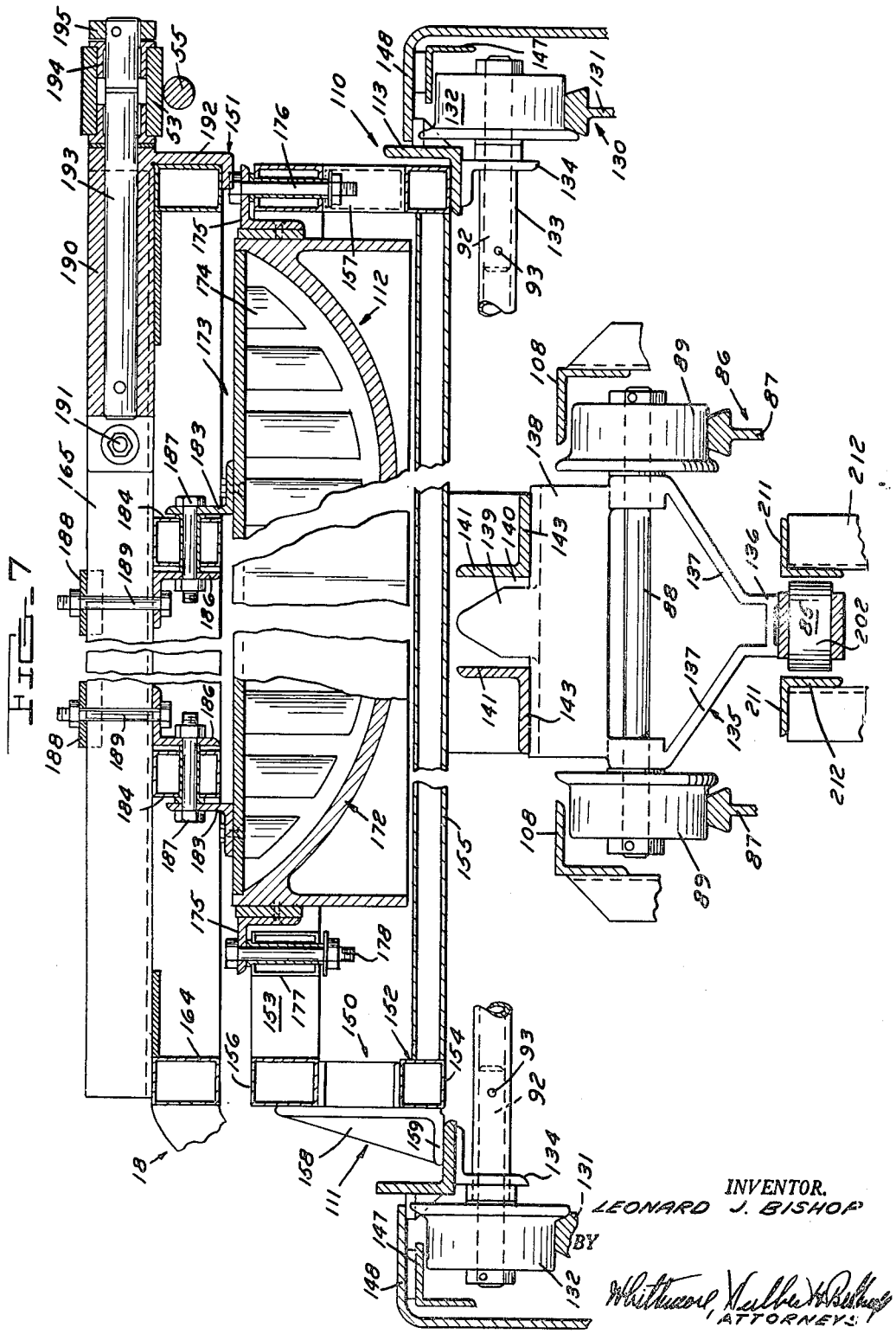

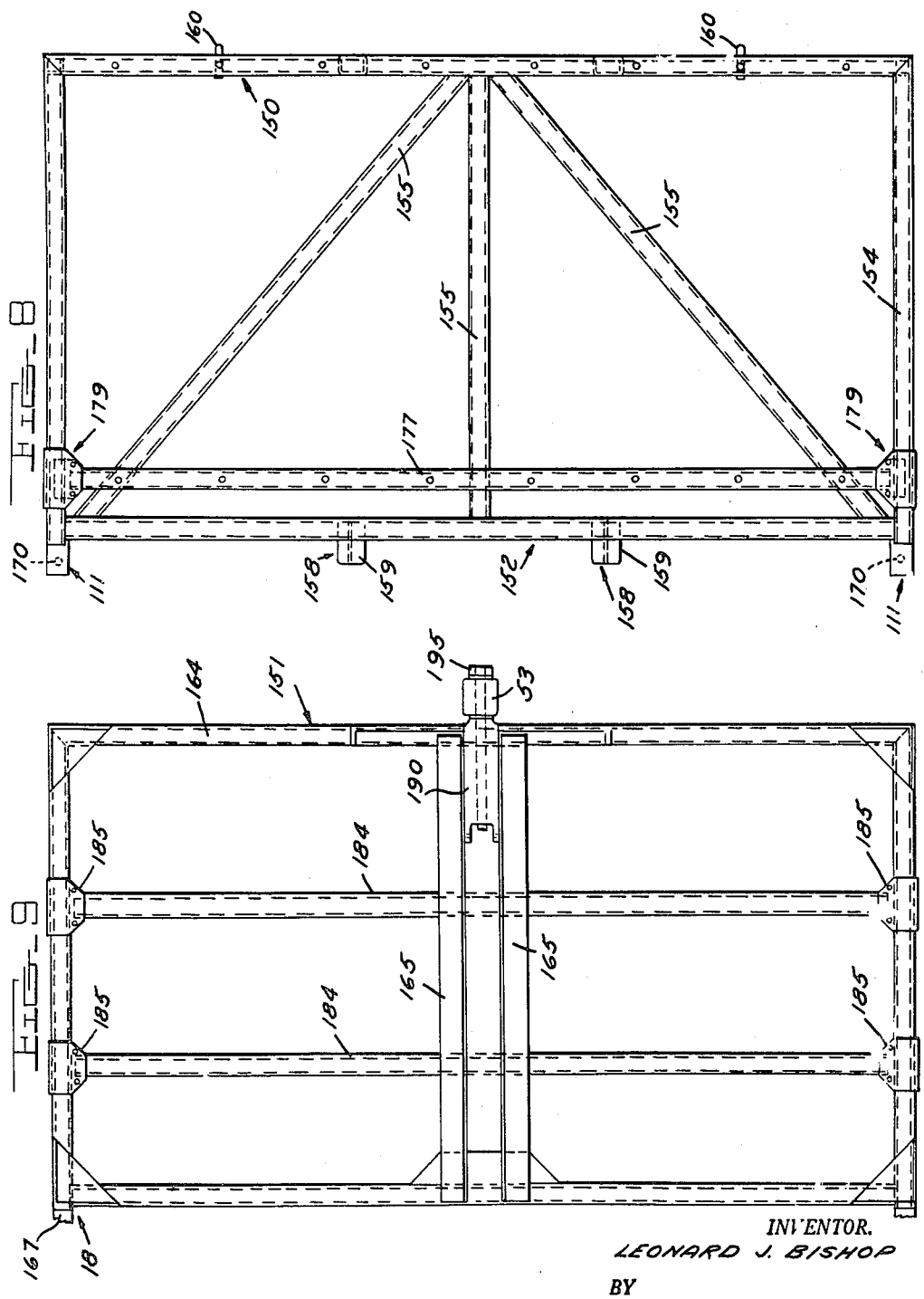

July 24, 1956      L. J. BISHOP      2,755,505
MOLDING PLANT
Original Filed Aug. 6, 1951      19 Sheets-Sheet 15
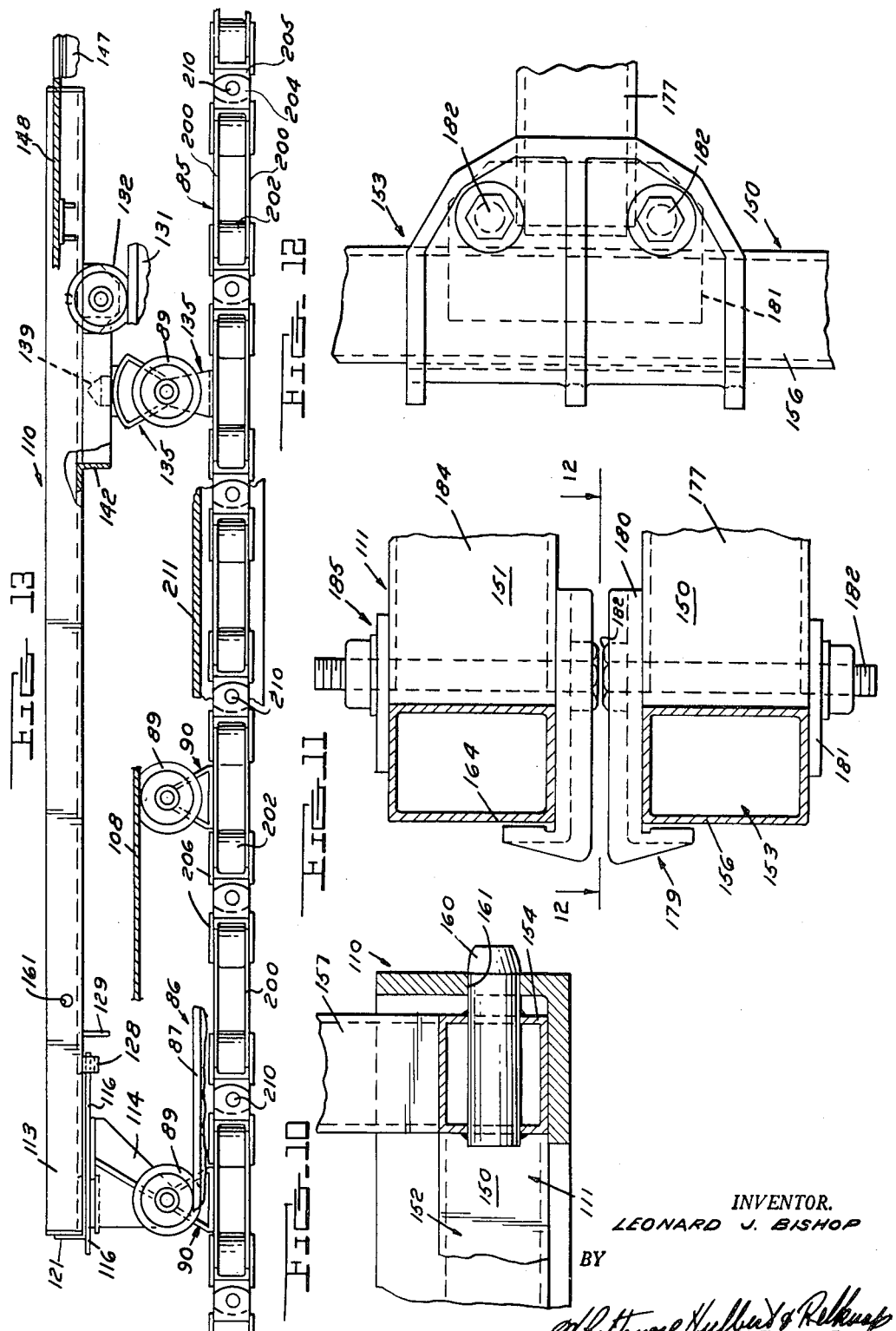
INVENTOR.
LEONARD J. BISHOP
BY
*Whittemore, Hulbert & Belknap*
ATTORNEYS

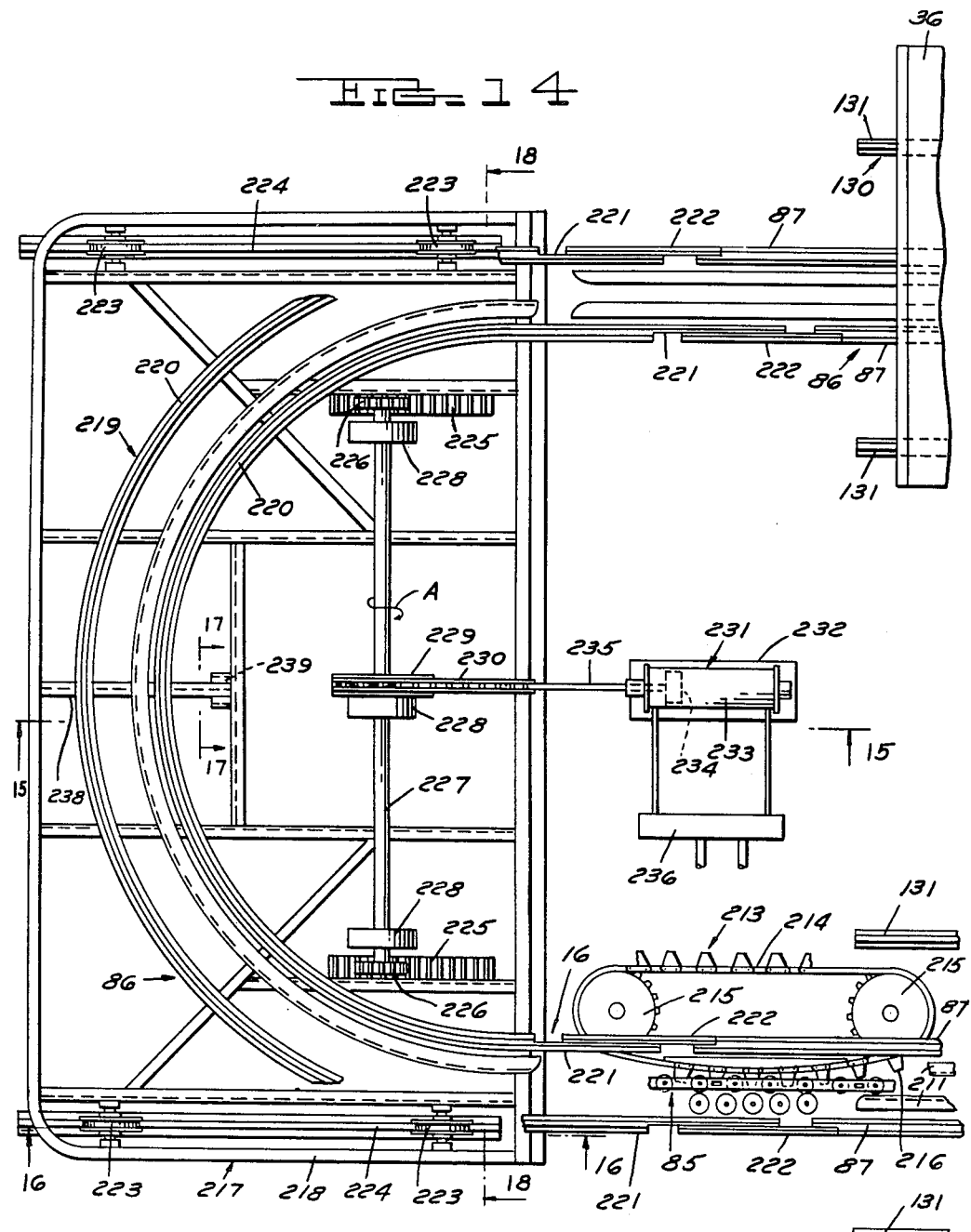

July 24, 1956    L. J. BISHOP    2,755,505
MOLDING PLANT
Original Filed Aug. 6, 1951    19 Sheets-Sheet 17
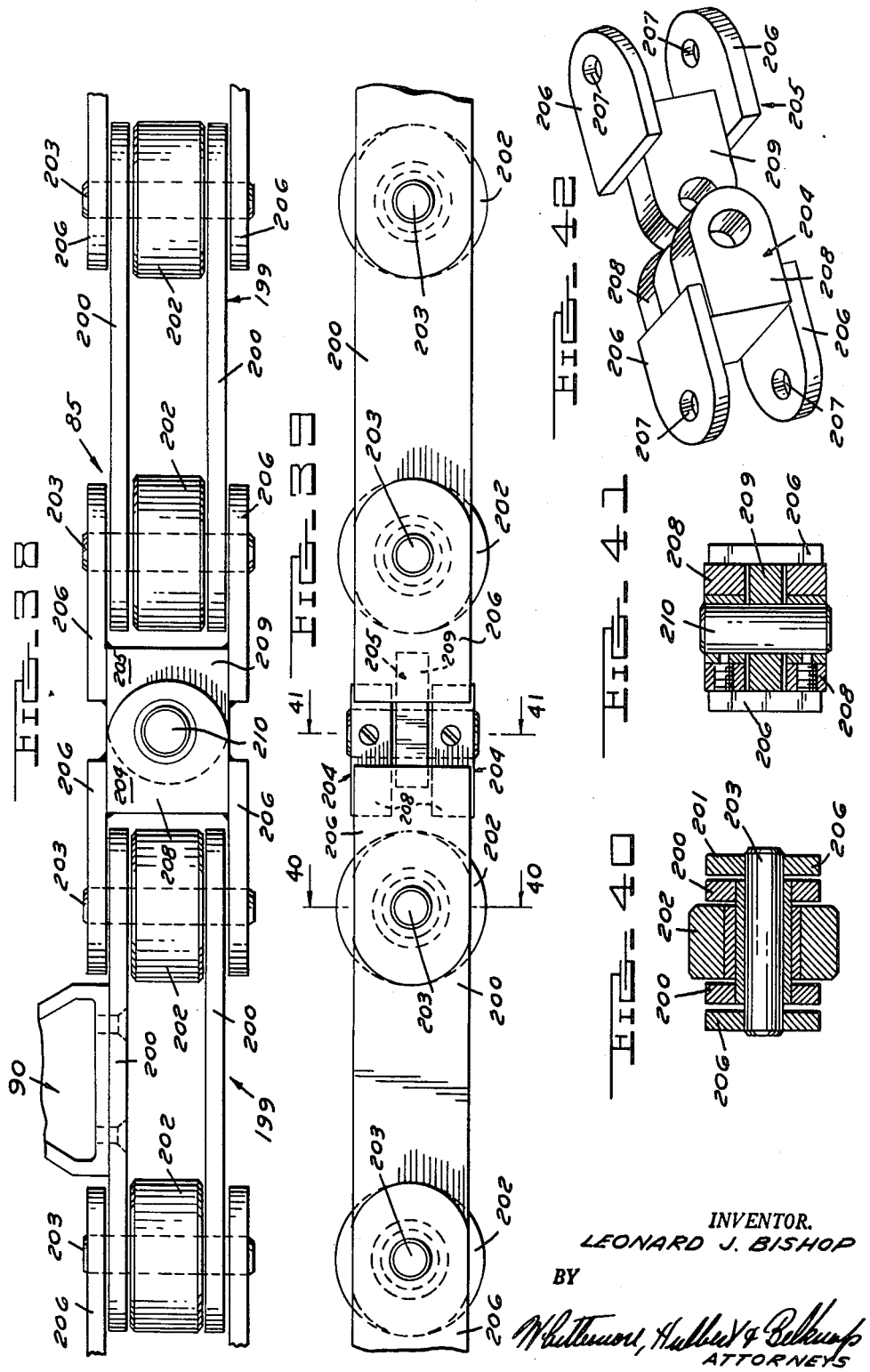
INVENTOR.
LEONARD J. BISHOP
BY
Whittemore, Hulbert & Belknap
ATTORNEYS July 24, 1956  L. J. BISHOP  2,755,505
MOLDING PLANT
Original Filed Aug. 6, 1951  19 Sheets-Sheet 18
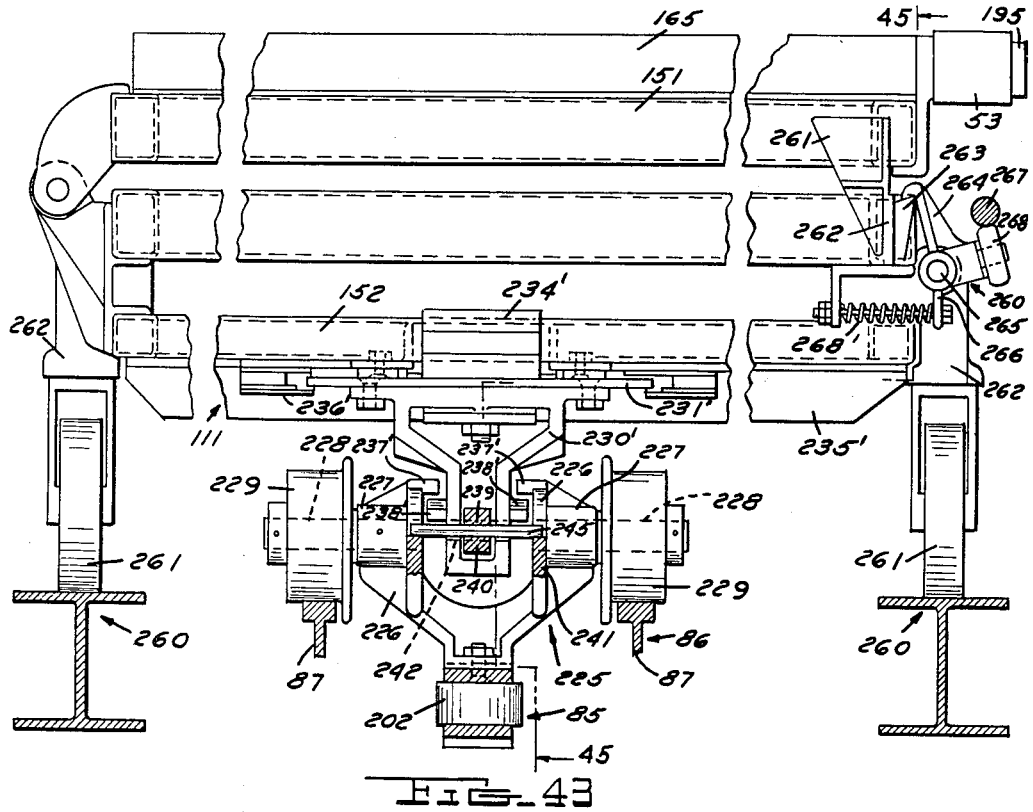
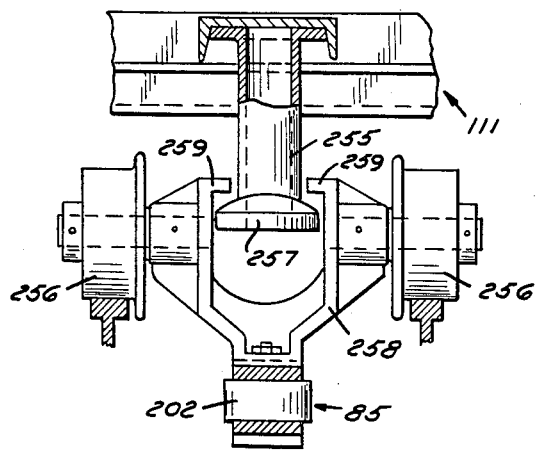
INVENTOR.
LEONARD J. BISHOP
BY
*Whittemore, Hulbert & Belknap*
ATTORNEYS

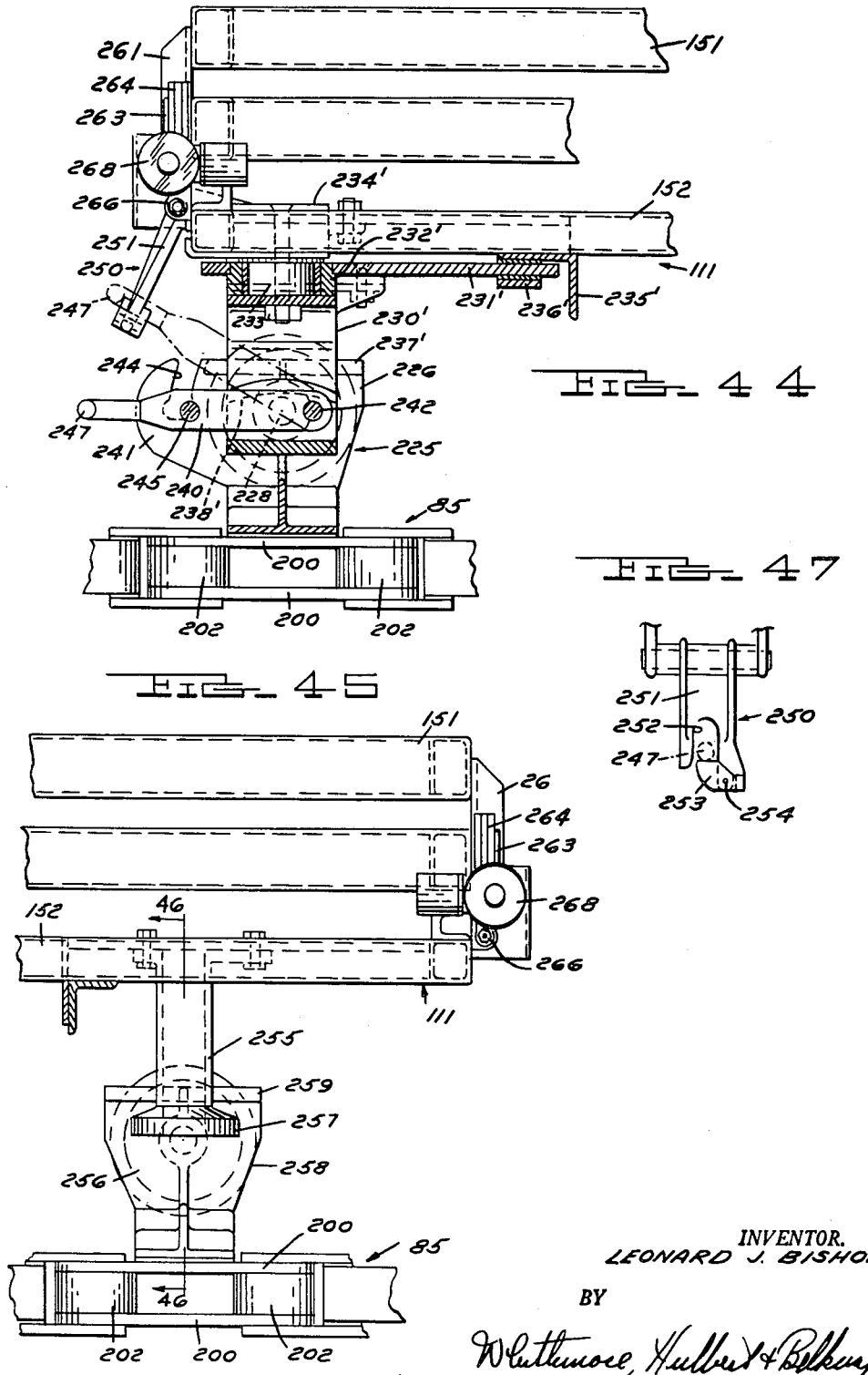

United States Patent Office 2,755,505
Patented July 24, 1956

2,755,505

MOLDING PLANT

Leonard J. Bishop, Birmingham, Mich., assignor to Mechanical Handling Systems, Inc., Detroit, Mich., a corporation of Michigan Original application August 6, 1951, Serial No. 240,567. Divided and this application July 28, 1952, Serial No. 301,340

14 Claims. (Cl. 18—4)

This invention relates to apparatus embodying a conveyor and having provision for producing a product of manufacture while the latter is advanced along a predetermined path of travel, and is a division of my copending application, Ser. No. 240,567 filed August 6, 1951, now Patent 2,713,935 of July 26, 1955.

Although the apparatus is not restricted for use in the manufacture of any specific type of product, nevertheless, it finds particular utility when employed in the production of moldable products, such for example, as foam rubber mattresses, pillows and the like.

It is one of the principal objects of this invention to provide apparatus capable of being installed in a relatively small space, and having provision for performing the various steps in the method of manufacture of a selected product in one continuous operation.

Another object of this invention is to provide a conveyor having a flexible linear member, such for example, as a chain constructed in a manner to enable advancing the same along a continuous closed path of travel having sections arranged at different elevations.

It is still another object of this invention to connect one end of a carriage to the flexible linear member in a manner such that the carriage may be swung upwardly relative to the linear member and may also be turned to either side of the path of travel of the linear member.

A further object of this invention is to provide a guide for the carriage having provision for tilting or raising the carriage relative to the linear member as the latter travels from one elevation to another. This construction attributes several distinct advantages to the apparatus, among which are: (1) it permits reducing the radius of curvature of the linear member at the zones where a change in elevation occurs without interference with the carriage; and (2) it permits maintaining the carriage level as the elevation of the linear member varies. Hence the elevation of the carriage may be abruptly changed without the danger of tilting or otherwise disturbing the horizontal position of the carriage. This latter feature is especially desirable where molds containing a liquid or fluid material are supported on the carriage.

A still further object of this invention is to support the swinging end of the carriage on the linear member by a part projecting upwardly from the linear member between laterally spaced guiding surfaces on the carriage. The guiding surfaces extend in the direction of the length of the linear member and the supporting part is removable from the space between said surfaces in response to swinging movement of the carriage in an upward direction.

Another object of this invention is to provide a pallet having a mold supporting base section and having a lid hinged along one side edge to the base section for swinging movement between open and closed positions relative to the mold carrying base section.

Still another feature of this invention is to provide means on the pallet base section for removably holding molds of various sizes, and to also provide means on the lid for removably supporting covers of a size to close the molds mounted on the base section.

A further object of this invention is to provide a construction of the type noted in the two preceding paragraphs wherein the pallet and its associated lid are quickly removably supported on the carriage.

A still further object of this invention is to provide means for successively opening and closing the pallet lid relative to the base section as the carriage is successively advanced by the linear member to a stripping or unloading station and to a filling or loading station.

Another object of this invention is to suspend the conveyor chain or flexible linear member from a track having a looped section supported on a platform which is adjustable in a direction to vary the effective length of the linear member and thereby affords a simple take-up for this member.

Still another feature of the present invention is to provide a track of the type set forth in the preceding paragraph having rails equipped with extensible sections to enable the length of the track to be varied in response to movement of the take-up means.

In addition to the foregoing the present invention contemplates apparatus wherein the conveyor track passes through a heating tunnel or chamber, and wherein both the track and the tunnel are equipped with expansion joints, which compensate for temperature variations that may exist from time to time within the tunnel.

The foregoing as well as other objects will be made more apparent as this description proceeds, especially when considered in connection with the accompanying drawings, wherein:

Figure 1 is a diagrammatic perspective view of apparatus embodying the features of this invention;

Figure 2 is a semidiagrammatic plan view of approximately one-half of the apparatus shown in Figure 1;

Figure 2A is a semidiagrammatic plan view of the remainder of the apparatus shown in Figure 1;

Figure 3 is a side elevational view partly broken away of the apparatus shown in Figure 2;

Figure 3A is a side elevational view of the apparatus shown in Figure 2A;

Figure 4 is a fragmentary sectional view taken on the line 4—4 of Figure 2;

Figure 5 is a fragmentary elevational view partly in section showing one of the mountings for the pallet on the carriage;

Figure 6 is a sectional view taken on the line 6—6 of Figure 4;

Figure 7 is a fragmentary cross sectional view through one of the mold supporting carriages;

Figure 8 is a plan view of the pallet supported on the carriage;

Figure 9 is a plan view of the pallet lid;

Figure 10 is a fragmentary sectional view showing the connection between the pallet and the carriage;

Figure 11 is a sectional view taken on the line 11—11 of Figure 4;

Figure 12 is a fragmentary plan view looking in the direction of the arrows 12—12 of Figure 11;

Figure 13 is a fragmentary sectional view of a part of the conveyor chain and showing the carriage in position thereon;

Figure 14 is a fragmentary plan view showing the takeup means provided at one end of the conveyor;

Figure 15 is a sectional view taken on the line 15—15 of Figure 14;

Figure 16 is a sectional view taken on the line 16—16 of Figure 14;

Figure 17 is a sectional view taken on the line 17—17 of Figure 14;

Figure 18 is a sectional view taken on the line 18—18 of Figure 14;

Figure 19 is a fragmentary plan view of the front end of a carriage;

Figure 20 is a fragmentary cross sectional view through the apparatus and taken at the heating chamber;

Figure 21 is an enlarged sectional view of the portion of Figure 20 surrounded by the circle 21;

Figure 22 is an enlarged sectional view of the portion of Figure 20 surrounded by the circle 22;

Figure 23 is a sectional view taken on the line 23—23 of Figure 21;

Figure 26 is a sectional view taken on the line 26—26 of Figure 2A;

Figure 27 is a sectional plan view looking in the direction of the arrows 27—27 on Figure 26;

Figure 28 is a sectional view taken on the line 28—28 of Figure 27;

Figure 29 is a fragmentary side elevational view partly in section of the heating chamber and support therefor;

Figure 30 is a fragmentary sectional view through one of the track engaging wheels;

Figure 31 is a sectional view taken on the line 31—31 of Figure 3A;

Figure 32 is a fragmentary longitudinal sectional view taken through the cooling tunnel or chamber of the apparatus;

Figure 33 is a sectional view taken on the line 33—33 of Figure 2;

Figure 34 is a sectional view taken on the line 34—34 of Figure 3;

Figure 35 is a sectional view taken on the line 35—35 of Figure 3;

Figure 36 is a sectional view taken on the line 36—36 of Figure 3;

Figure 37 is a schematic perspective view of the construction shown in Figure 36;

Figure 38 is a fragmentary plan view of the conveyor chain;

Figure 39 is a side elevational view of the construction shown in Figure 38;

Figure 40 is a cross sectional view taken on the line 40—40 of Figure 38;

Figure 41 is a cross sectional view taken on the line 41—41 of Figure 39;

Figure 42 is a perspective view of adjacent parts of the conveyor chain and showing the same separated from one another.

Figure 43 is a front end elevational view partly in section of a modified form of construction;

Figure 44 is a fragmentary side elevational view partly in section of the construction shown in Figure 43;

Figure 45 is a fragmentary side elevational view of the rear end of the pallet and showing the connection between the rear end of the pallet and conveyor chain;

Figure 46 is a sectional view taken on the line 46—46 of Figure 45; and

Figure 47 is a fragmentary front elevational view of the latch mechanism shown in Figure 44.

Figure 25:
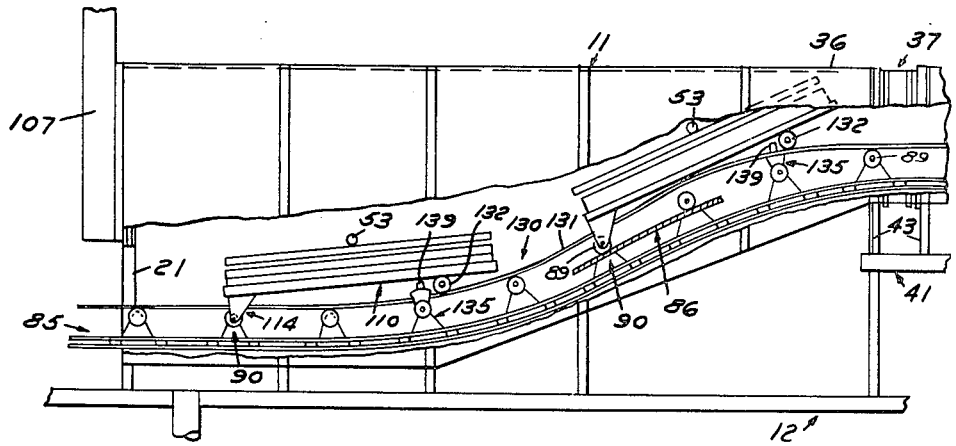
Figure 25 is a semidiagrammatic fragmentary sectional view of the delivery end of the heating chamber.

In order to facilitate an understanding of the present invention, the apparatus is illustrated herein as used in the manufacture of foam rubber pillows, although it will be understood as this description proceeds that the apparatus as a whole, or certain parts thereof, may be advantageously employed in the manufacture of various diversified products. Foam rubber pillows are usually manufactured in half sections and the latter are subsequently cemented or otherwise secured together to form completed pillows. The apparatus about to be described concerns itself with the production of the half sections.

With the above in view reference is made to Figures 1, 2, 2A, 3 and 3A of the drawings, wherein it will be noted that the apparatus comprises six stations indicated generally by the reference characters 10 to 15 inclusive. These stations are arranged consecutively around a continuous or closed path of travel indicated generally by the reference character 16. A continuous conveyor 17 is moved throughout the length of the path of travel 16, and a plurality of mold assemblies 18 are connected to the conveyor 17 in spaced relation to each other along the length of the conveyor. The arrangement is such that the mold assemblies 18 are successively advanced by the conveyor 17 through the six stations 10 to 15 inclusive.

The station 10 is hereinafter referred to as the loading or pouring station, and the molds carried by the assemblies 18 are open when positioned at the station 10, so that the specified foam rubber composition may be poured of otherwise inserted into the molds at the station 10. However, molds at this station could be closed and latched or otherwise held closed to facilitate injection molding.

The station 11 is hereinafter referred to as a curing station, and is in the form of a tunnel or chamber which extends along the rear side of the path of travel 16 or conveyor 17. The front end of the curing chamber 11 is positioned adjacent the rear end of the loop at the front end of the conveyor 17, and has an entrant opening 19 adjacent the bottom thereof. The rear end of the curing chamber is curved around the loop at the rear end of the conveyor 17 and extends to a position adjacent the station 12. A wall 20 closes the rear end of the curing chamber 11, and this wall has an exit opening 21 adjacent the bottom thereof.

It follows from the foregoing that the conveyor 17 with the mold assemblies 18 thereon enters the curing chamber 11 through the opening 19 and leaves the curing chamber through the opening 21. As will be more fully hereinafter described, the interior of the curing chamber 11 is filled with steam to cure the contents of the molds in the length of time required for the molds to travel the full length of the curing chamber 11.

It is pointed out generally at this time that the molds of the assemblies 18 are automatically opened as they leave the delivery end of the curing chamber 11, and remain open until they are advanced to the delivery end of the pouring station 10 where the molds are closed. After the molds leave the pouring station, they travel around the loop of the conveyor before reaching the curing chamber. During this travel, the liquid contents of the mold are "jelled," prior to being cured by the effect of the steam in the curing chamber.

The station 12 is referred to hereinafter as the unloading or stripping station, and at this point along the path of travel 16, the operator strips the completed pillow section or sections from the molds. The pillow sections removed from the molds are deposited on another conveyor (not shown), and are introduced to suitable cleaning and drying equipment which likewise is not shown herein.

The station 13 is in the form of a chamber or tunnel 22, and embodies suitable equipment to be hereinafter described for cooling and drying the molds of the assemblies 18 as the latter are advanced through the chamber 22. From the chamber 22 the mold assemblies 18 are advanced by the conveyor 17 through station 14. Station 14 comprises a conventional spray room 23, and this room embodies the required arrangement of spray nozzles for applying a coating to the molds carried by the assemblies 18. The purpose of the coating is to facilitate stripping the foam rubber sections from the molds, and this coating may be in the form of a liquid composition including a wax and a solvent. The coating may be applied to either the bottom or top sections of the molds, depending upon whether the pillow sections are to be stripped from the bottom or top sections of the molds. In the event the pillow sections are to be stripped from the bottom sections of the molds, the coating is applied to the top sections. In practice it is desirable to also coat the outer sides of the mold cover sections so that any foam rubber composition escaping through the vent openings may be readily cleaned from the cover sections. This cleaning is done at stripping station 12.

The station 15 also comprises a tunnel or chamber 24, and the purpose of this chamber is to dry the coating on the molds of the assemblies 18 during the interval the latter are advanced through the chamber 24 by the conveyor 17. As will more fully hereinafter be described, suitable blowers are associated with the chamber 24 in a manner to direct preheated air toward those parts of the molds coated at station 14. The loading or pouring station 10 is positioned directly in advance of the station 15 to receive the mold assemblies 18 as the latter leave the delivery end of the chamber 24.

Curing chamber

As stated above the station 11 comprises an elongated curing chamber, and in Figure 20 of the drawings, the curing chamber is shown as comprising an outer shell 25, an inner shell 26 and heat insulating material 27 located within the space between the shells. The outer wall of the chamber has spaced openings 28 therethrough of sufficient size to provide access to the interior of the chamber, and these openings are normally closed by doors 29.

The interior of the cooling chamber is heated by discharging steam into the chamber from a source of supply 30 located exteriorly of the chamber. The source of supply 30 is connected by suitable plumbing 31 to steam jets 32 located within the curing chamber below the conveyor 17 and directed upwardly. Similar jets 33 are positioned within the chamber 11 above the conveyor 17 and are directed toward the latter. It is to be understood that the steam jets 32 and 33 are spaced along the length of the curing chamber. The bottom wall 34 of the curing chamber 11 is sloped toward a drain 35 in the manner shown in Figure 20, so that condensate may readily escape from the interior of the curing chamber.

Referring now more in detail to Figures 2 and 2A of the drawings, it will be noted that the curing chamber 11 is formed of a plurality of longitudinal sections 36, which are secured together by expansion joints 37. As shown in Figures 26 and 27, the adjacent ends of the sections 36 are actually spaced from each other, and these spaces are closed by the expansion joints 37 which are sufficiently flexible to enable substantial relative movement of the sections 36 in response to variations in temperature. Each expansion joint 37 comprises a pair of flexible sheets 38, preferably formed of neoprene or some equivalent synthetic rubber, and having the marginal edges respectively secured to opposite sides of frame members 39 by clamping strips 40. The frame members 39 are respectively secured to adjacent ends of the chamber sections 36 and extend entirely around the chamber 11. It will of course be understood that the expansion joints 37 also extend completely around the curing chamber, and that the number of these joints may be varied to suit existing conditions.

Upon reference to Figures 20, 21 and 23, it will be noted that the curing chamber 11 is supported throughout its length on a subframe structure indicated generally by the reference character 41. It will also be noted from Figure 20 that the curing chamber is reinforced by a skeleton frame structure 42, and this frame structure includes vertical frame members 43 respectively located at opposite sides of the chamber 11. The lower ends of the vertical frame members 43 project below the bottom wall 34 of the chamber 11 and rest on channel frame members 44 forming a part of the subframe structure 41. As shown in Figures 21 and 23, upwardly opening channels 45 are respectively secured to the frame members 44, and blocks 46 of insulating material are respectively secured within the channels 45. Suitable wear plates 47 are respectively secured to the top surfaces of the blocks 46, and provide bearing plates for shoes 48 fixed to the lower ends of the vertical frame members 43. The channels 45, blocks 46, and wear plates 47 are respectively secured to the frame members 44 by studs 48. It follows from the above that the curing chamber 11 is not only heat insulated from the subframe 41 by the blocks 46 of insulating material, but in addition, longitudinal movement of the several sections 36 of the curing chamber relative to the subframe 41 is permitted by reason of the sliding engagement of the shoes 48 with the adjacent bearing plates 47.

Stripping station

It has previously been stated that the molds on the assemblies 18 are stripped at the station 12. This station occupies the open space between the delivery end of the curing chamber 11, and the entrant end of the cooling chamber 22. As the closed molds enter the station 12, the top sections thereof are successively swung to open positions by a cam 50. The cam is in the form of a rail having an upwardly inclined section 51 and having a straight section 52. The upwardly inclined section 51 is positioned to engage rollers 53 on the top sections of the molds, opposite to the hinged sides, as the mold assemblies 18 pass out of the delivery end of the curing chamber 11. The arrangement is such that upon continued advancement of the mold assemblies 18 along the station 12, the top sections of the molds are swung upwardly to their open positions by the inclined section 51 of the cam 50.

The straight section of the cam 52 extends through the stations 13, 14, 15 and 10 and maintains the top sections of the molds in their open positions as the mold assemblies are advanced by the conveyor 17 through the above stations. The top sections of the molds are successively closed as the mold assemblies 18 approach the delivery end of the station 10, and this is accomplished by engagement of the rollers 53 with a downwardly extending section 54 on the cam 50.

In order to assure holding the top sections of the molds in the upright open positions shown in Figure 1 of the drawings, a second rail 55 is spaced inwardly from the straight section 52 of the rail 50. The rail 55 is positioned to have a rolling engagement with the inner sides of the rolls 53, and thereby coacts with the straight section 52 of the rail 50 to maintain the top sections of the molds in upright positions as the mold assemblies are advanced from the station 12 to the delivery end of the station 10. It will also be noted from Figure 1 of the drawings that the front end 56 of the rail 55 is curved outwardly in substantially parallel relationship to the upper end of the section 54 of the cam 50. The curved portion 56 of the rail 55 has a camming action on the rollers 53, and serves to direct the top sections of the molds downwardly along the cam section 54.

Cooling station

The cooling station 13 is shown more in detail in Figures 31, 32, 33 and 34. As stated above the station 13 comprises a chamber or tunnel 22, and this chamber is open at the entrant end to receive the mold assemblies 18 advancing from the station 12. Suitably supported within the chamber 22 adjacent the entrant end is a plurality of groups of spray nozzles 57 supplied with a cooling medium such as water through suitable plumbing 58. As shown particularly in Figure 31, one group 59 of the spray nozzles are positioned to spray the cooling medium against the inner surfaces of the top sections of the mold assemblies 18, a second group of spray nozzles 60 are positioned to direct the spray against the outer surfaces of the top sections of the molds, a third group of spray nozzles 61 are positioned below the conveyor 17 to direct cooling medium against the bottom surfaces of the molds, and a fourth group of spray nozzles 62 are positioned to direct cooling medium against the inner surfaces of the bottom sections of the molds. Thus all surfaces of the molds are subjected to the action of the cooling medium as the mold assemblies 18 are advanced through the chamber 22 by the conveyor 17.

As the open mold assemblies are advanced through the chamber 22 toward the exit opening 63, the molds are dried by directing air under pressure against the same. Upon reference to Figure 2 of the drawings, it will be noted that the open top sections of the molds are required to pass between a pair of air nozzles 64 which are respectively connected to blowers 65 mounted on supporting structure 66 located above the top wall of the chamber 22. The blowers 65 are respectively connected to the nozzles 64 by conduits 66 which extend downwardly through openings in the top wall of the chamber 22. The nozzles 64 discharge blasts of air against the opposite sides of the top sections of the mold as the latter are advanced through the chamber 22, and any cooling medium adhering to the top sections is blown off of the latter.

Also as shown in Figure 32 of the drawings, additional air nozzles 67 are supported within the chamber 22 in positions to direct air under pressure against the bottom surfaces of the molds passing through the chamber. The nozzles 67 are respectively connected to blowers 68 by conduits 69. The blowers 68 are mounted on the supporting structure 66 above the top wall of the chamber 22, and the conduits 69 project into the chamber 22 through openings formed in the top wall of the latter. It follows from the above that the nozzles 64 and 67 cooperate with one another, to blow excess moisture off of the molds as the latter approach the delivery end 63 of the chamber 22. In order to assist drainage of all of the moisture from the base sections of the molds, the mold assemblies 18 are tilted in the manner indicated in Figure 32 during their path of travel past the groups of cooling medium spray nozzles 57 and the air nozzles 64, 67. The manner in which the mold assemblies 18 are tilted during the above operations will be more fully hereinafter described.

The bottom wall of the chamber 22 is formed by a foundation material 68, and the top surface of the bottom wall is shaped to drain moisture through a drain opening 69 formed in the bottom wall. It will also be noted that the top wall of the chamber 22 serves as a support for brackets 70 which in turn provide anchors for the cam 50 and the retaining rail 55.

As shown in Figure 34 of the drawings, baffles 71 are suitably secured to the chamber 22 at the delivery end of the latter; and if desired a similar arrangement of baffles may be provided at the entrant end of the chamber 22. These baffles cooperate to intercept moisture tending to escape from opposite ends of the chamber 22.

Spray booth

The spray booth is located at the station 14, and as noted above, has a chamber 23. The chamber 23 is located at the delivery end of the cooling chamber 22, and has openings in the opposite side walls enabling the mold assemblies 18 to be advanced through the chamber 23 by the conveyor 17. The spray booth is not shown in detail herein, because any one of a number of conventional water wash booths may be used. As diagrammatically shown in Figure 35 of the drawings, spray nozzles 73 are respectively supported in positions to direct the coating material against opposite sides of the top section of the molds on the assemblies 18 as the latter are advanced through the chamber 23.

As stated above the coating material is preferably in the form of a wax containing a solvent and is of a nature to prevent adhering of the foam rubber to the inner surfaces of the top mold sections when the latter are swung to their open positions at the station 12. In other words the foam rubber pillow sections are retained in the base sections of the molds, and are stripped from the latter at the station 12. If the pillow sections are to be retained in the top sections of the molds, the spray nozzles will be arranged to coat the inner surfaces of the bottom sections.

Coating drying chamber

It has previously been stated that the coating sprayed on the molds in the booth at station 14 is dried as the molds pass through the chamber 24 at station 15. As shown particularly in Figures 36 and 37, air ducts 74 open into the interior of the chamber 24, and are directed toward opposite side surfaces of the top sections of the molds on the assemblies 18, as the latter are advanced by the conveyor 17 through the chamber 24.

The discharge openings in the ducts 74 are provided with adjustable louvers 75 for altering the direction of flow of the air to suit existing conditions. The ducts 74 are also connected to the discharge side of a blower 76, and air is drawn into the blower through a suitable intake manifold 77. A heating coil 78 is suitably supported in the intake manifold 77 in a position to heat the air to the warming temperature required for drying the coating in the time provided for the molds to advance through the chamber 24.

It will be noted from Figure 36 of the drawings that brackets 79 are secured to the top wall of the chamber 24, and these brackets serve as anchorage means for the cam 50 and the retaining rail 53. It will also be noted that the bottom 80 of the chamber 24 is a continuation of the foundation 68, previously described in connection with the chamber 22; and has a drain 81 to enable the escape of any moisture settling on the bottom 80 of the chamber. It will further be noted that opposite ends of the chamber 24 may also be baffled in a manner similar to the chamber 22 in order to minimize air drafts through the chamber.

Pouring station

The pouring station 10 is located between the delivery end of the drying chamber 24 and the entrant end of the curing chamber 11. The station 10 is open in order to permit the molds to be filled from a suitable source of foam rubber supply, and the filling operation may be effected manually or automatically.

Conveyor

As shown in Figures 4, 13 and 20, the conveyor 17 comprises a flexible linear member in the form of a link chain 85 which extends continuously around the path 16, and is supported at spaced points along its length by a track 86. The track 86 comprises rails 87 spaced laterally from each other and positioned at opposite sides of the chain 85. A plurality of axles 88 extend transversely of the track 86 in spaced relation lengthwise of the track, and each axle has flanged wheels 89 journalled on opposite ends in positions to respectively engage the rails 87. Each axle 88 is connected to the link chain 85 by a yoke 90 having arms 91 journalled on the adjacent axle 88 and having the central portion suitably secured to the top of the chain 85. Thus the chain 85 is connected at longitudinally spaced points along its length to the respective axles 88 for turning movement about the axles, and the purpose of this construction will be more fully hereinafter described.

As shown in Figure 30 of the drawings, the wheels 89 are journalled on opposite ends of the axle 88, and are fashioned with a chamber 94 therein. The chambers 94 communicate with lubricant passages 95 formed in opposite ends of the axle 88 and extending axially from the outer ends of the axle. Thus lubricant may be inserted into the chambers 94 through the passages 95, and supplied to the bearing surfaces from the chambers 94. The wheels are fixed on opposite ends of the axle 88 by collars 96 which are respectively secured to the axle 88 by pins 97. Suitable thrust bearings 98 are provided between the inner sides of the wheels 89, and the adjacent arms 91 of the yoke 90 in order to reduce friction to a minimum.

Referring again to Figure 20 of the drawings, it will be noted that the rails 87 of the track 86 are mounted on suitable frame structure indicated by the numeral 99, which may be supported in any suitable manner, and which engages the rails 87 at spaced points along the length of the rails. In Figure 22 of the drawings, a typical mounting for the rails 87 is shown; and it will be noted that the rails are seated in a saddle 100 which, in turn, is secured to the frame structure 99. Suitable clips 101 are secured to opposite sides of the saddle 100 by fastener elements 102, and these clips respectively overlie the flanges projecting laterally outwardly from the rails 87 at the bottom of the latter. It is to be understood that the rails 87 may move along the saddles 100, and sufficient clearance is provided between the clips 101 and the rails to assure such movement. This movement is desirable in order to compensate for expansion and contraction due to temperature variations.

Referring now to Figures 26 to 28 inclusive, it will be noted that the rails 87 are interrupted in length in the region of the expansion joints 37; and as a consequence, the track 86 is actually formed of a plurality of sections. The adjacent ends of the sections are notched as at 103, or in other words, are cut away along the median plane of the rails; and the spaces between adjacent ends of the rails are bridged by track sections 104. The sections 104 have a cross section such that they cooperate with the notched ends of the rails to form a complete rail section, and are secured in place by fastener elements 105 shown in Figure 28 as extending through elongated slots 106 in the rail sections 104. With this construction expansion and contraction of the track is provided for while at the same time affording a continuous supporting surface for the wheels 89.

Figure 24:
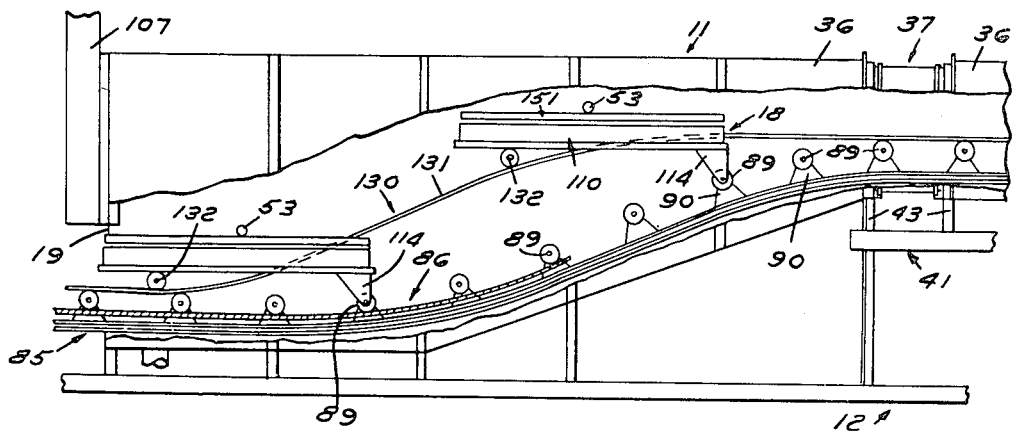
Figure 24 is a semidiagrammatic view partly in section of the entrant end of the heating chamber.

As will be presently described, the flexible chain 85 is of a nature to not only enable advancement of the same along the looped ends of the path of travel 16, but to also permit moving the chain to different elevations as it is advanced along the path of travel 16. In Figure 24 of the drawings, the chain 85 and associated supporting track 86 are shown as curved upwardly from the entrant end of the curing chamber 11 to an elevation in relatively close proximity to the top of the chamber 11. As shown in Figure 25 of the drawings, the chain 85 and associated supporting track 86 are curved downwardly from the higher elevation back to the lower elevation. As a result of the above the major portion of the length of the curing chamber 11 may be of reduced depth and occupies a position above the entrant and exit openings at the opposite ends of the curing chamber 11. Such a construction is advantageous in that it reduces to a minimum the tendency for the heated atmosphere within the curing chamber to escape out of the entrant and exit openings. In this connection it will be noted from Figure 1 of the drawings that suitable flues 107 are provided at the entrant and exit openings 19 and 21 respectively to dissipate any steam escaping through these openings.

The pivotal connection previously described between the yokes 90 and the axles render it possible to move the chain 85 vertically along a curved path of relatively small radius without the danger of binding or unduly stressing the structure. Attention is also called to the fact at this time that vertical displacement of the wheels 89 relative to the track 86 is avoided by hold-down rails 108 suitably supported on the frame structure 99 directly above the path of travel of the wheels 89, and extending for substantially the full length of the track 86.

*Mold assembly*

The mold assembly 18 is actually considered as a part of the conveyor unit 17. Upon reference to Figures 4, 6, 7, 8, 9, 19 and 20, it will be noted that each mold assembly 18 comprises a carriage 110, a pallet 111, and a mold 112. Each carriage 110 comprises a rectangular frame formed of angle bars 113. The front end of each carriage is connected to one of the axles 88 in a manner to permit relative turning movement about an axis extending perpendicular to the axle 88. With this in view, reference is made more in detail to Figures 4 and 19 of the drawings, wherein it will be noted that a pair of vertical brackets 114 is journalled at the lower ends thereof on one of the axles 88 in spaced relation to each other axially of this axle. The upper ends of the brackets 114 are secured by fastener elements 115 to a plate 116. As shown particularly in Figure 6 of the drawings, the front end portion of the plate 116 is apertured, and a bushing 117 is secured in the aperture of the plate 116. The bushing 117 has a lining 118 which forms a bearing for a journal 119. The top of the journal has a plate portion 120 which engages the underside of the front bar of the carriage, and is fashioned with an upstanding flange 121 positioned at the front side of the carriage. The flange 121 is secured to the front bar of the carriage by fastener elements 122, so that the journal 119 is actually fixed to the carriage. The bottom side of the journal 119 is engaged by a plate 123, and this plate is secured to the journal and the carriage by a fastener element 124. The plate 123 has a locating pin 125 engageable in an opening 126 in the journal to properly locate the parts during assembly. The rear end of the plate 116 is shown in Figures 6 and 19 as projecting into a guide 127. This guide comprises a strap 128 spaced below the bottom of the carriage a sufficient distance to freely receive the rear end of the plates 116 and secured to a cross bar 129 of the carriage. Thus the strap 128 coacts in effect with the bottom of the carriage to form a slot for receiving the rear end of the plate 116; and the length of this slot is such as to permit limited relative angular movement of the carriage and plate 116 about the axis of the journal 119. If desired suitable wear blocks 129 may be secured to the bottom of the carriage in positions to bear against the top surface of the plate 116 adjacent opposite sides of the latter.

It is to be understood that each of the carriages are pivoted to the chain 85 in the same manner described above; and hence, these carriages may not only turn relative to the chain about vertical axes, but may also tilt relative to the chain about the axles 88. The rear end of each carriage 110 is guided by a track 130 comprising rails 131 spaced laterally outwardly from opposite sides of the track 86 and respectively engaged by flanged wheels 132. The flanged wheels 132 are journalled on opposite ends of an axle 133, and this axle is supported on the carriage by brackets 134. The rails 131 of the track 130 extend only along the straight sides of the path of travel 16; and as shown in Figure 26, are mounted on suitable frame structure 135 in the same manner as the tracks 86 are mounted on the frame structure 99. Also the rails 131 of the track 130 are interrupted at the expansion joints 37 in the curing chamber 11. Thus the rails 131 are formed of sections and the adjacent ends of these sections are secured together in the same manner as previously described in connection with the rails 86. Hence the rails 131 may also move relative to their supporting structure 135' to permit expansion and contraction caused by variations in temperature.

As shown particularly in Figures 7 and 13 of the drawings, the rear end portions of the carriages are also supported on the chain 85, and this is accomplished by yokes 135. The yokes 135 have central portions 136 respectively secured to the chain 85 in positions adjacent the rear end portions of the carriages 110. In addition the yokes have arms 137, which are respectively journalled on certain of the axles 88 and the arms of each yoke are connected by a cross bar 138. Each cross bar 138 has an upstanding projection 139, and this projection extends into a space 140 formed between a pair of guides 141. The guides 141 extend in the direction of advancement of the carriage and are secured at opposite ends to cross bars 142 of the carriage. It will be observed from Figure 7 that the guides 141 have laterally outwardly extending horizontal flanges 143 at the bottom which rest on the cross bars 138 of the yokes 135.

With the above in view reference is again made to Figures 24 and 25 of the drawings. In Figure 24 it will be noted that the rails 131 are also curved upwardly from the entrant end 19 of the curing chamber 11. However the curved contour of the rails 131 is such that the rear end portions of the carriages are raised by the rails 131 sufficiently to maintain the carriages level as they are advanced along the upwardly curved portions of the track 86. In other words the rails 131 coact with the flanged wheels 132 at the rear ends of the carriages to swing the latter upwardly about the axles 88 at a rate so determined with respect to the radius of curvature of the track 86 that the carriages are maintained level as they are advanced upwardly by the chain 85. This arrangement is highly advantageous in the present instance where the molds on the carriages contain foam rubber in liquid form; and it is essential to avoid tipping the molds from their level positions at this stage of the operation. When the carriages are advanced beyond the curved sections of the tracks 86, 130, the rear end portions of the carriages are again lowered into seating relationship with the adjacent yokes 138 in the manner shown in Figure 7 of the drawings.

As shown in Figure 25 of the drawings, the rails 131 of the track 130 are curved downwardly adjacent the delivery end of the curing chamber, and the radius of curvature is somewhat greater than that of the track 86, so that the rear ends of the carriages are again raised off of the yokes 138. This tilting movement of the carriages renders it possible to decrease the radius of curvature of the tracks at the delivery end of the curing chamber without interference with the bottom of the carriage, and permits correspondingly reducing the overall length of the apparatus.

As shown in Figure 32 of the drawings, the rails 131 of the track 130 have sections 145 within the cooling chamber 22 elevated with respect to the corresponding section of the track 86, and have inclined ramp portions 146 connecting opposite ends of the elevated sections 145 to the respective rails 131. The construction is such that as the wheels 132 at the rear ends of the carriages 110 ride upwardly along the ramp portions 146 adjacent the entrant end of the chamber 22, the carriages 110 are elevated or tilted to enable draining any moisture accumulating in the base sections of the molds. The carriages remain in their tilted position until the wheels 132 ride downwardly along the ramp portions 146 adjacent the delivery end of the chamber 22, whereupon the carriages again assume a horizontal or level portion.

As shown in Figures 1, 4, 7 and 20, accidental vertical displacement of the carriages relative to the track 130 is prevented by hold-down rails 147 suitably supported to assume positions directly above the wheels 132 on the carriages. At the open stations 10 and 12, suitable guards 148 are positioned at the outer sides of the track 130, and the upper ends of the guards are turned laterally inwardly to extend over the rails 147 in the manner clearly shown in Figures 4 and 7 of the drawings. These guards not only prevent accidents, but also protect the conveyor structure from foreign matter and the like.

*Pallet*

The pallet 111 is shown in detail in Figures 4 and 7 to 12 inclusive. The pallet 111 comprises a base 150, and a lid 151. The base has a bottom section 152 and a top section 153 spaced vertically above the bottom section. The bottom section comprises a plurality of tubular frame members 154 suitably secured together at the ends to form a rectangular frame which is reinforced by a suitable arrangement of tubular braces 155.

The top section 153 also comprises a plurality of tubular frame members 156 having the extremities secured together to form a rectangular frame of substantially the same size as the bottom section 152. The top section 153 is secured to the bottom section 152 in vertical spaced relationship by spacers 157 and by brackets 158, shown particularly in Figure 7 of the drawings and by hinge sections 168 shown in Figures 4 and 5. The brackets 158 are secured to the inner sides of the bottom and top sections 152 and 153 respectively. These brackets have laterally outwardly extending flanges 159 which are adapted to rest on the adjacent side bar of the carriage 110, as also shown in Figure 7 of the drawings. The outer side bar of the bottom section 152 is seated directly on the adjacent bar of the carriage 110, and suitable pins 160 are secured to the outer frame bar of the bottom section in spaced relationship. The ends of the pins 160 respectively project through openings 161 formed in the outer side of the carriage 110 in the manner shown in Figure 10 of the drawings.

During assembly, the base section 152 of the pallet is shifted outwardly relative to the carriage in order to extend the pins 160 on the base section through the openings 161 in the outer side of the carriage. The base section 152 is then lowered to engage the flanges 159 on the brackets 158 with the inner side of the carriage as shown in Figure 7. In order to lock the base section 152 in position on the carriage, suitable hooks 162 are pivoted to opposite ends of the top section 152 adjacent the inner side thereof, and are engageable with pins 163 respectively secured to opposite ends of the carriage 110 at the inner side of the latter.

The pallet lid 151 comprises a plurality of tubular frame bars 164 suitably secured together at the ends to form a rectangular frame which is braced intermediate the ends by a pair of laterally spaced braces 165. The frame bar 164 at the inner side of the lid 151 is connected at opposite ends to the top section 153 of the pallet base 150 by hinges 166. The hinges 166 have sections 167 secured to the lid and have sections 168 secured to the top section 153 and bottom section 152 of the base 150. The hinged sections are pivoted together by means of pins 169. The pins 169 are in horizontal alignment to enable upward swinging movement of the lid 151 from its closed position shown in Figures 4 and 7 to its open position shown in Figure 33, for example. It will be noted from Figure 5 that the hinge sections 168 have depending extensions which rest on the adjacent bar of the carriage 110, and are fashioned with vertically extending recesses 170 for receiving positioning pins 171 extending upwardly from the carriage. The pins 171 act to locate the pallet on the carriage in a position to enable attachment of the pallet to the carriage by the hooks 162.

*Mold assembly*

The mold assembly 112 has a bottom section 172 and a top section 173. The bottom section 172 has a shape depending upon the contour of the product to be molded, which in the present instance, is a foam rubber pillow. The top section 173 is in the form of a plate having a plurality of depending projections 174 which are adapted to project into the bottom section of the mold to form the required cores in the foam rubber pillow.

The bottom mold section 172 is supported on the base 150 of the pallet, and the top section 173 is supported on the lid 151 of the pallet. As shown particularly in Figure 7, angle members 175 are respectively secured to opposite sides of the mold section 172 in a manner such that the flanges project laterally outwardly from the mold section. The flange on the outer angle member 175 overlies the top of the adjacent side of the top section 153, and is secured to the latter by fastener elements 176. The flange on the inner angle member 175 overlies a tubular bar 177 and is secured to this bar by fastener elements 178.

As shown in Figures 8, 11 and 12, the opposite ends of the tubular bar 177 are slidably supported on the end frame members 154 of the top pallet section 153 by clamps 179. The clamps 179 have parts 180 which are secured to opposite ends of the bar 177 at the top of the latter, and are shaped to hook over the end frame members 156 of the pallet top section 153. In addition the clamps are provided with plates 181, which are positioned to overlie the bottom surfaces of the ends of the bar 177, and the end frame bars 156, as shown particularly in Figure 11 of the drawings. The parts 180 and the plates 181 are respectively clamped to the end bars 156 by fastener elements 182. Thus the bar 177 may be adjusted along the end frame bars 156 of the pallet top section 153 to accommodate mold base sections 172 of different widths.

As shown particularly in Figure 7 of the drawings, a pair of angle members 183 are secured in lateral spaced relationship to the top surface of the mold section 173. The bars 183 are respectively secured to tubular rails 184, which extend lengthwise of the lid and have the opposite ends slidably supported on the end frame bars 164 by clamps 185. The clamps 185 are similar to the clamps 179 previously described and permit the rails 184 to be independently adjusted relative to the lid 151. Thus the cover section 173 of the mold may be accurately positioned with respect to the base section 172, and cover sections of different sizes may be accommodated.

Attention is again called to Figure 7 of the drawings, wherein it will be noted that the rails 184 are attached intermediate the ends thereof to the bars 165. For accomplishing this result, angle members 186 are respectively secured to the rails 184 at the sides thereof directly opposite the angle members 183, and common fastening means 187 is provided for securing the angle members 183 and 186 to the respective rails 184. The angle members 186 are attached to the bars 185 by clamps 188 which engage the top surfaces of the bars 165 and are clamped to the latter by fastener elements 189. The construction is such that by loosening the fastener elements 189 as well as the clamps 185, the rails 184 may be readily adjusted relative to the pallet lid 151.

Referring again to Figure 7 of the drawings, it will be noted that a casting 190 is positioned between the bars 165 adjacent the outer ends thereof, and is secured to these bars by fastener elements 191. The casting 190 also has a part 192 which is hooked under the outer frame member 164 of the lid. A shaft 193 is secured within a bore in the casting 190, and the outer end of the shaft forms a support for the roller 53. The roller is journalled on bearings 194 mounted on the shaft 193, and is held in place by a collar 195 pinned or other wise secured to the outer end of the shaft beyond the roller 53.

*Conveyor chain*

The conveyor chain 85 is shown in detail in Figures 38 to 42, inclusive; and comprises a plurality of pivotally connected sections 199. Each section 199 has vertically spaced links 200 which are secured together at opposite ends by a sleeve 201. A roller 202 is journalled on each sleeve 201 for rotation about the vertical axis of the sleeve. Also a pin 203 is rotatably supported in each sleeve 201, and the opposite ends of the pins project beyond the links 200.

The sections 199 are pivotally connected together for swinging movement relative to each other, and this is accomplished in the manner shown particularly in Figures 41 and 42. In detail a pair of brackets 204 and 205 are respectively pivotally connected to adjacent ends of the sections 199. These brackets are provided with vertically spaced plates 206 having aligned openings 207 therethrough. The plates 206 on the bracket 204 respectively overlie the ends of the links 200 of one section 199 in a manner such that the projecting ends of the pin 203 extend through the openings 207. The plates 206 of the section 205 are similarly mounted on the adjacent end of the next chain section 199, with the result that the brackets may pivot freely about the vertical axes of the pins 203.

The bracket 204 has laterally spaced ears 208, which are adapted to receive therebetween an ear 209 on the brackets 205. The ears 208 and 209 have aligned openings therethrough for receiving a pivot pin 210 having its axis perpendicular to the axes of the pins 203. Thus the adjacent sections 199 of the conveyor chain are capable of relative pivotal movement in horizontal and vertical directions. As a result the conveyor chain 85 is sufficiently flexible to permit the same to travel around the looped ends of the path of travel 16, and to also move vertically to different elevations.

The purpose of the rollers 202 on the conveyor chain 85 is to engage guides 211 shown in Figure 7 of the drawings as supported on suitable frame structure 212 at opposite sides of the conveyor chain. The guides 211 may be extended for the full length of the path of travel 16, and assure proper action of the chain. Referring again to Figure 38 of the drawings, it will be noted that the yokes 90 are secured to the top links 200 of the chain at the appropriate points along the length of the chain. The yokes 135 are similarly secured to the top links 200 of the chain at the required locations along the length of the chain.

The chain 85 may be driven in any suitable manner, and one method of driving the chain is indicated diagrammatically in Figure 14 by the numeral 213. Briefly a caterpillar type chain 214 is rotated in a horizontal plane by sprockets 215 positioned to locate the outer side of the chain 214 adjacent the inner side of the chain 85. At least one of the sprockets 215 is driven by a suitable prime mover not shown herein, and the cleats 216 on the chain 214 are arranged to successively engage in the spaces provided between the rollers 202 on the chain 85.

*Conveyor chain take-up mechanism*

In Figures 14 to 18 inclusive, mechanism 217 is shown for taking up any slack in the conveyor chain 85. This mechanism comprises a platform 218 supported at the front end of the path of travel 16, and forming a support for the front looped section 219 of the track 86. The rails 220 of the looped section 219 respectively connect the front ends of the rails 87 extending along the straight sides of the path of travel 16. As shown particularly in Figure 14, the extremities 221 of the rails 220 are respectively connected to the rails 87 by rail sections 222. The specific construction of the connections between the rails 220 and the rails 87 is the same as shown in Figures 26 to 28 inclusive in connection with the expansion joints 37. Briefly the bridging rail sections 222 have slotted connections with the adjacent ends of the rails 87 and 220, so that the loop section 219 of the track may be moved fore and aft relative to the rails 87.

The conveyor chain 85 of course extends around the loop section 219 of the track between the rails 220, and any slack in the chain 85 is taken up by moving the platform 218 in a forward direction. In order to accomplish this result the platform is equipped with flanged wheels 223 at opposite sides thereof, and these wheels are respectively supported on track sections 224. A pair of racks 225 are respectively secured to the platform 218 adjacent opposite sides of the latter, and extend parallel to the tracks 224. The racks 225 are respectively engaged by pinions 226, secured to opposite ends of a shaft 227. The shaft 227 is journalled in bearings 228, and the latter are suitably mounted on a fixed support indicated generally in Figure 18 by the reference character 229.

It follows from the above that rotation of the shaft 227 in the direction of the arrow A in Figure 14 of the drawings moves the platform 218 forwardly to tighten the conveyor chain 85, and rotation of the shaft 227 in the opposite direction causes the platform 218 to move rearwardly, and thereby loosen the conveyor chain 85. The shaft 227 is rotated by a sprocket 229 and a chain 230. The front end of the chain extends over the top of the sprocket 229 in the manner shown in Figure 15, and is suitably secured to the sprocket 228. The rear end of the chain 230 is connected to a fluid motor 231 mounted on a fixed support 232. The fluid motor 231 comprises a cylinder 233 extending in the direction of movement of the platform 218, and a piston 234 is slidably mounted in the cylinder 233. The piston 234 is connected to the rear end of the chain 230 by a connecting rod 235. The opposite ends of the cylinder 233 are respectively connected to a source of fluid under pressure through the medium of a valve 236, which is normally in a position to admit fluid under pressure into the cylinder 233 at the front side of the piston 234. As a result the platform 218 is continually urged in a forward direction to maintain the conveyor chain 85 taut.

As an additional guide for the platform 218, a track 237 is positioned intermediate opposite sides of the platform 218 and extends parallel to the tracks 224. The track 237 is I-shaped in cross section, and is fixed below the platform 218. A rail 238 is mounted on the platform 218 directly above the track 237, and rollers 239 are supported from the rail 238 in positions to respectively engage opposite sides of the track 237, as clearly shown in Figure 17 of the drawings. This construction not only assists in guiding the platform 218, but also serves to hold the platform down on the guide rails 238 at opposite sides of the platform.

*Operation*

Assuming that the parts are in the relative positions shown in Figure 1 of the drawings, it will be noted that the molds 112 at the station 10 are open. In other words the top sections 173 of the molds at the station 10 are swung upwardly to a vertical position, enabling the bottom sections 172 of these molds to be filled with the selected foam rubber composition. This filling operation may be effected while the carriages 110 are advanced along the path of travel 16. When the carriages 110 approach the end of the pouring station 10, the rollers 53 on the pallet lids 151 are released by the cam rail 50, and the lids are swung downwardly to bring the top mold sections 173 in closed relationship to the bottom mold sections 172. Before the lids are closed, the contents of the molds are levelled by scraping the top surface of the liquid rubber.

After the lids are closed, the carriages 110 continue their advancement. They pass around the loop track section 219 and enter the curing chamber 11 through the entrant opening 19. As the carriages enter the curing chamber 11, they are elevated to the upper regions of the curing chamber, and the molds 112 are maintained in a level position during elevation of the carriages, as clearly shown in Figure 24 of the drawings. During this travel around the loop track section 219, and during the period when the molds rise into the curing chamber, the contents of the molds will "jell" before the curing operation takes place. As the carriages are advanced along the curing chamber, the contents of the molds 112 are cured, and at the end of the curing operation, the carriages are again lowered to their original elevation at the exit end of the curing chamber in the manner indicated in Figure 25 of the drawings.

The carriages leaving the curing chamber through the exit opening 21 are admitted to the unloading or stripping station 12. As the carriages approach the stripping station 12, the rollers 53 are engaged by the section 51 of the cam rail 50, and the pallet lids 151, together with the top sections of the molds 173 are swung upwardly to their vertical positions. The finished molded product may then be stripped from the bottom mold section 172, and disposed of in any desired manner.

From the station 12 the carriages advance through the chamber 22 at the station 13; and, as shown in Figure 31 of the drawings, a cooling medium such as water is sprayed on the carriages and mold sections to cool the same. Also the sections of the molds are subjected to blasts of air issuing from the nozzles 64 and 67 to blow excess moisture from the mold sections. During this operation the carriages are again tilted as noted in Figure 32 of the drawings to facilitate draining of moisture from the bottom sections 172 of the molds.

The carriages leaving the chamber 22 at station 13 are advanced through the chamber 23 at the station 14. As shown in Figure 35, a coating of a suitable wax mixed with a solvent is sprayed against opposite sides of the top sections 173 of the molds by suitable nozzles 73. This coating enables the top mold sections 173 to be withdrawn from the molded product at the station 12 previously described.

The carriages leaving the exit end of the chamber 23 at station 14 are admitted to the chamber 24 at station 15. As shown in Figure 36 of the drawings, heated air is directed toward opposite sides of the top sections 173 of the molds to dry the coatings previously applied to these sections. The carriages leaving the chamber 24 at the station 15 are admitted to the pouring station 10 where the cycle of operation is repeated.

The embodiment of the invention shown in Figures 43 to 47 inclusive illustrates a construction wherein the carriage 110 previously described may be omitted. Upon reference to Figures 43 and 44, it will be noted that a yoke 225 is fixed to the conveyor chain 85 in the same manner as the yoke 90 described in connection with the above modification. However the arms 226 of the yoke 225 are each provided with a boss, and these bosses are formed with aligned bores having a common axis extending perpendicular to the conveyor chain 85. Shafts 228 are respectively journalled in the bosses 227 and project laterally outwardly from the bosses for supporting flanged wheels 229. The wheels 229 are respectively supported on the rails 87 of the track 86.

The yoke 225 is pivotally connected to the bottom section 152 of the pallet 111 for turning movement about a vertical axis. Referring again to Figure 43 of the drawings, it will be noted that a casting 230' is secured at the upper end to a plate 231' and this plate has a bearing 232' secured thereto adjacent the front end thereof. The bearing 232' is supported on a journal 233', and the latter is secured to the front bar of the bottom section 152 of the pallet 111 by a clamp 234'. The vertical axis of the journal 233' is located in a vertical plane which also includes the axis of the shaft 228, and the arrangement is such as to permit free turning movement of the pallet 111 relative to the conveyor chain 85. The rear end of the plate 231' has a bearing contact with a cross bar 235' mounted on the bottom pallet section 152, and is held in position relative to the cross bar 235' by a strap 236'. This construction imparts stability to the pivotal connection between the pallet and conveyor chain.

In the present instance the pallet 111 is removably connected to the yoke 225. Referring again to Figures 43 and 44, it will be noted that the lower end of the casting 231' projects downwardly between the arms 226 on the yoke 225 and is held against vertical displacement relative to the yoke 225. In this connection it will be noted that the upper ends of the arms 226 have inwardly extending lugs 237', and the lower end of the casting has laterally outwardly extending projections 238' which serve as stops to engage the lugs 237' and prevent withdrawal of the casting 230' from the yoke in an upward direction. Hence during assembly the lower end of the casting must be moved horizontally into its position between the arms 226 of the yoke 235'.

The casting 230' is latched to the yoke 225 by an arm 240, and a keeper 241. The rear end of the arm 240 is pivoted by a pin 242 to the lower end of the casting 230', and the keeper 241 comprises projections which extend forwardly from the yoke 225, at opposite sides of the arm 240. In this connection it is pointed out that the axis of the pin 242 extends horizontally, so that the arm 240 is capable of swinging movement in a vertical plane between the projections 241. Projecting laterally outwardly from opposite sides of the arm are suitable bosses 243, and the projections 241 of the keeper have upwardly opening slots 244 for respectively receiving the bosses 243. As shown in Figure 44 of the drawings, the rear walls of the slots are recessed as at 245 to receive the bosses 243 and thereby prevent accidental upward swinging movement of the arm 240.

The outer end 247 of the arm 240 projects beyond the keeper 241 and serves as a handle to enable swinging the arm in an upward direction out of the slots 244. In this connection it will be noted that due to the recesses 245, the pallet must be advanced slightly relative to the conveyor chain or a yoke 225 in order to permit releasing the arm 240 from the keeper 241. After the arm 240 is released from the keeper 241, the pallet 111 is moved forwardly sufficiently to release the projections 238' from the lugs 237'. In this connection attention is called to the fact that the upper surfaces of the projections 238' are convexedly curved to enable the pallet to assume various angularly related positions with respect to the conveyor chain 85 about the shafts 228.

When the arm 240 is released from the keeper 241, it assumes the dotted line position thereof shown in Figure 44, and is held in this position by a latch 250. As shown in Figure 47, the latch 250 comprises an arm 251 supported at its upper end on the front end of the pallet 111 and having a slot 252 arranged to receive the free end of the arm 240 when the latter is swung to its dotted line position shown in Figure 44. A gravity operated keeper 253 is pivoted to the arm 251 by a pin 254. This keeper extends across the entrant end of the slot 252, and is swung upwardly upon moving the arm into the slot 252. As the arm assumes a position within the slot 252, the keeper swings downwardly into blocking relation to the entrant end of the slot, and holds the arm 240 in its uppermost position shown by the dotted lines in Figure 44.

The rear end of the pallett 111 is supported on the conveyor chain 85 by a vertical post 255 and a yoke 256. As shown in Figures 45 and 46, the yoke is secured to the conveyor chain 85, and the post 225 is secured to the bottom pallet section 152 adjacent the rear end of the latter. The bottom of the post 255 has a head 257, which extends between the arms 258 of the yoke, and is held against vertical displacement relative to the yoke by flanges 259 which extend laterally inwardly from the arms 258 in overlying relationship to the head 257. It will be noted that the top surface of the head is convexedly curved in order to enable relatively free angular movement of the pallet 111 about the shafts 228. It will be understood from the foregoing construction that the head 257 is released from the yoke 256 when the pallet 111 is shifted sufficiently to disengage the casting 230' from the yoke 225.

The rear end of the pallet is supported on tracks 260 by caster wheels 261. These wheels are carried by brackets 262, which in turn, are suitably secured to opposite sides of the pallet base section 152. The caster wheels 261 not only engage the track 260 to support the rear end of the pallet 111 as it is advanced by the conveyor chain 85; but in addition, serve to engage the ground or flooring when the pallet is removed from the conveyor chain and thereby enable conveniently transporting the pallet.

Referring again to Figure 43 of the drawings, it will be noted that the pallet lid 151 is latched in its closed position by means of a spring operated latch 269. A bracket 261 is secured to the swinging side of the lid 151, and has a depending portion 262. The depending portion 262 has a keeper 263 and the top surface of this keeper is engageable by a latch hook 264. The hook 264 is pivoted on the pallet base section 152 by a pin 265, and has a lug 266 which projects downwardly with respect to the pivot 265. The lug 266 is engaged by a spring 268 which acts on the lug to normally urge the hook 264 into engagement with the keeper 263.

The hook 264 is released from the keeper 263 against the action of the spring 268 by a cam rail 267, and by a follower wheel 268 rotatably supported on the hook 264 in a position to engage the cam rail 267. The cam rail 267 is similar to the cam rail 50, and is fixed against movement to one side of the path of travel of the pallet. This cam rail is located along the path of travel in a position where it is desired to release the pallet lid 151. In practice the cam rail 267 is located at the delivery end of the curing chamber 11 in a position to release the latch 260 prior to engagement of the roller 53 on the lid with the cam rail 50. With the above exceptions the embodiments of the invention shown in Figures 43 to 47 inclusive is substantially the same as the construction described above in connection with Figures 1 to 42, inclusive.

What I claim as my invention is:

1. In apparatus of the class described, a conveyor having a carriage, a pallet having a base section supported on the carriage and having a lid hingedly connected along one side to the adjacent side of the base section, pins projecting laterally from the opposite side of the base section and engageable in registering openings in the adjacent side of the carriage, and locating pins projecting upwardly from the carriage and positioned to engage in registering openings formed in a part of the pallet adjacent the hinged side of the lid.

2. The apparatus defined in claim 1 having means for removably holding the hinged side of the pallet downwardly against the carriage.

3. In apparatus of the class described, a conveyor having a carriage member, a pallet having a base member supported on the carriage member and having a lid hingedly connected along one side to the adjacent side of the pallet base member, and means for removably securing the pallet base member to the carriage member comprising hooks pivoted to one member adjacent one side thereof, projections positioned on the other member for engagement with the hooks, and a projection extending laterally from the opposite side of one member engageable in a registering opening in the adjacent side of the other member.

4. In apparatus of the class described, a conveyor having a carriage, a pallet having a base section supported on the carriage and having a lid hingedly connected along one side to the adjacent side of the base section, pins projecting laterally from the opposite side of the base section and engageable in registering openings in the adjacent side of the carriage, locating pins projecting upwardly from the carriage and positioned to engage in registering openings formed in a part of the pallet adjacent the hinged side of the lid, and means for removably holding the hinged side of the pallet downwardly against the carriage comprising hooks pivoted to the pallet adjacent the hinged side thereof and projections positioned on the carriage for engagement with the hooks.

5. In apparatus of the class described, a flexible linear member movable along a predetermined path of travel, a pallet connected to the linear member for advancement by the latter along said path of travel, a track having rails respectively extending along opposite sides of the flexible linear member, a part secured to the flexible linear member and having aligned axles extending transversely of the flexible linear member, wheels journaled on the axles and respectively engageable with the rails of said track, a second part pivoted to the pallet for turning movement about a vertical axis, said second part having an extension and means secured to said pallet providing a transverse slot spaced from said vertical axis and receiving said extension, thereby providing stability for the pivotal connection between the pallet and second part, and a releasable latch detachably connecting the first and second parts.

6. In apparatus of the class described, a flexible linear member movable along a predetermined path of travel, a pallet movable as a unit with said linear member along said path of travel, a first part secured to said linear member, a second part pivoted to said pallet for turning movement about a vertical axis, said second part having an extension, means secured to said pallet providing a transverse slot spaced from said vertical axis and receiving said extension, thereby providing stability for the pivotal connection between said pallet and said second part, and a releasable connection between said first and second parts.

7. In apparatus of the class described, a conveyor having a carriage member, a pallet member supported on said carriage member, a pin projecting laterally from one side of one of said members and engageable in a registering opening in the adjacent side of the other member, and a vertically extending locating pin projecting from the opposite side of one of said members and engageable in a registering opening in the adjacent side of the other member.

8. In apparatus of the class described, a conveyor having a carriage member, a pallet member supported on said carriage member, and means for removably securing said pallet member on said carriage member comprising hooks pivoted to one member adjacent one side thereof, projections positioned on the other member for engagement with the hooks, and a projection extending laterally from the opposite side of one member engageable in a registering opening in the adjacent side of the other member.

9. In apparatus of the class described, a conveyor having a carriage, a pallet having a base section supported on the carriage and having a lid hingedly connected along one side to the adjacent side of the base section, a mold removably supported on the base section and open at the top, a cover for the mold, means removably supporting the mold on the base section of the pallet including a member slidably mounted on said base section and means for locking said member in selected positions of adjustment to accommodate molds of different sizes, and means removably supporting the cover on the lid including members independently slidably mounted on said lid and means for locking said last-mentioned members in selected positions of adjustment to accommodate covers of different sizes in position to register with a mold supported on the base section.

10. In apparatus of the class described, a conveyor having a carriage member, a pallet member supported on said carriage member, a projection extending laterally from one side of one of said members and engageable with a recess in the corresponding side of the other member to hold said members against relative horizontal shifting movement transversely of said projection and to hold said pallet member against being raised relative to said carriage member, and a vertical abutment on one of said members adjacent the opposite side thereof and engageable with a complementary abutment on the corresponding side of the other member preventing relative movement of said members in a direction to move said projection away from and out of engagement with said recess.

11. The apparatus defined in claim 10 including a latch carried by one member adjacent said opposite side thereof, and a part on the other member positioned for engagement with said latch to hold said pallet member against being raised relative to said carriage member.

12. In apparatus of the character described, a conveyor having a carriage member, a pallet member supported on said carriage member, and means for removably securing said pallet member on said carriage member comprising a latch carried by one member adjacent one side thereof, a part on the other member positioned for engagement with said latch, and a projection extending laterally from the opposite side of one member engageable in a registering recess in the adjacent side of the other member.

13. In apparatus of the class described, a flexible linear member movable along a predetermined path of travel, a pallet movable as a unit with said linear member along said path of travel, a pivot member operatively pivotally connected to said pallet for turning movement relative thereto about a vertical axis, said pivot member having an extension, means on said pallet spaced from said vertical axis and engageable with said extension to limit turning movement of said pivot member relative to said pallet, thereby providing stability for the operative pivotal connection between said pallet and said pivot member, and means operatively connecting said pivot member to said linear member.

14. In apparatus of the class described, a conveyor having a carriage, a pallet having a base section supported on the carriage and having a lid section hingedly connected along one side to the adjacent side of the base section, a mold member removably supported on the base section and open at the top, a cover member for the mold member removably supported on the lid section, means removably supporting one of said members on the associated section including a supporting member slidably mounted on the latter section and means for locking said supporting member in selected positions of adjustment to accommodate different sizes of said one member, and means removably supporting the other member on the associated section including supporting members independently slidably mounted on the latter section and means for locking said supporting members in selected positions of adjustment to accommodate different sizes of said other member in position to register with the said one member supported on its associated section.

References Cited in the file of this patent

UNITED STATES PATENTS

| Number | Name | Date |
|---|---|---|
| 1,201,131 | Althouse | Oct. 10, 1916 |
| 1,466,590 | Kelley | Aug. 28, 1923 |
| 1,566,275 | Harrison | Dec. 22, 1925 |
| 1,751,869 | Mayne | Mar. 25, 1930 |
| 1,958,422 | Dinzl | May 15, 1934 |
| 2,014,468 | Clayton | Sept. 17, 1935 |
| 2,027,165 | Grubman | Jan. 7, 1936 |
| 2,103,860 | Mazzeo | Dec. 28, 1937 |
| 2,128,492 | Mena | Aug. 30, 1938 |
| 2,301,125 | Kramp et al. | Nov. 3, 1942 |
| 2,308,977 | Iverson et al. | Jan. 19, 1943 |
| 2,347,117 | Luxenberger et al. | Apr. 18, 1944 |
| 2,351,529 | Luxenberger et al. | June 13, 1944 |
| 2,509,830 | MacMillan | May 30, 1950 |
| 2,553,029 | Bailey | May 15, 1951 |
| 2,619,370 | Leger | Nov. 25, 1952 |
| 2,619,916 | Rainier | Dec. 2, 1952 |
| 2,621,610 | Boyko et al. | Dec. 16, 1952 |